United States Patent
Jadhav et al.

(10) Patent No.: US 11,803,175 B2
(45) Date of Patent: Oct. 31, 2023

(54) INDUSTRIAL MACHINE MONITORING PATH FOR COMPUTERIZED MAINTENANCE MANAGEMENT SYSTEM

(71) Applicant: Rockwell Automation Technologies, Inc., Mayfield Heights, OH (US)

(72) Inventors: Sneha R Jadhav, San Jose, CA (US); Ryan P Dunn, Mayfield Heights, OH (US); Nabin Acharya, San Jose, CA (US); Chirayu S Shah, Milwaukee, WI (US); Anoop Mohan, Mayfield Heights, OH (US); Stuart Fergusson, Toronto (CA); Meraj Imani, Toronto (CA); Taylor Mathewson, Toronto (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 89 days.

(21) Appl. No.: 17/479,309

(22) Filed: Sep. 20, 2021

(65) Prior Publication Data
US 2023/0090297 A1    Mar. 23, 2023

(51) Int. Cl.
*G05B 19/418*    (2006.01)

(52) U.S. Cl.
CPC ... *G05B 19/41865* (2013.01); *G05B 19/4183* (2013.01); *G05B 19/4184* (2013.01); *G05B 19/4185* (2013.01)

(58) Field of Classification Search
CPC .......... G05B 19/41865; G05B 19/4183; G05B 19/4184; G05B 19/4185
See application file for complete search history.

(56) References Cited

U.S. PATENT DOCUMENTS

| | | | |
|---|---|---|---|
| 2011/0178977 A1* | 7/2011 | Drees ................ | H02J 13/00004 706/52 |
| 2014/0156033 A1* | 6/2014 | Daraiseh ............ | G05B 19/0428 700/79 |
| 2019/0025809 A1* | 1/2019 | Bhattacharya ......... | G06N 5/046 |
| 2020/0401124 A1* | 12/2020 | Dillon ................ | G05B 23/0283 |
| 2021/0278833 A1* | 9/2021 | Hafernik ............ | G05B 23/0272 |

* cited by examiner

*Primary Examiner* — Christopher E. Everett
(74) *Attorney, Agent, or Firm* — Amin, Turocy & Watson, LLP

(57) ABSTRACT

An industrial information hub (IIH) serves as a single industrial ecosystem platform where multiple participants can deliver repeatable and standardized services relevant to their core competencies. The IIH system can interface with a work order management system to facilitate automated creation and submission of work orders for maintenance tasks. To this end, the IIH system can monitor real-time data from industrial devices and identify conditions indicative of a performance issue requiring a maintenance action. When such a condition is identified, the IIH system can initiate creation of a work order in the work order management system for tracking and recording of the maintenance task.

20 Claims, 18 Drawing Sheets

INDUSTRIAL MACHINE MONITORING PATH FOR COMPUTERIZED MAINTENANCE MANAGEMENT SYSTEM

BACKGROUND

The subject matter disclosed herein relates generally to industrial automation systems, and, for example, to industrial work order management.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided, comprising a device interface component configured to communicatively connect, via a cloud platform, to a gateway device that collects industrial data generated by industrial devices associated with an automation system, and to receive the industrial data from the gateway device; a monitoring component configured to monitor the industrial data and to determine whether a subset of the industrial data satisfies a condition indicative of a performance issue of the automation system; and a work order interface component configured to, in response to a determination by the monitoring component that the subset of the industrial data satisfies the condition, send a work order instruction to a work order management system, the work order instruction initiating creation of a work order for performing a maintenance task to address the performance issue.

Also, one or more embodiments provide a method, comprising receiving, by a system comprising a processor via a cloud platform, industrial data from a gateway device that collects the industrial data from industrial devices associated with an industrial machine; monitoring, by the system, the industrial data for a condition indicative of a performance issue of the industrial machine; and in response to determining, based on the monitoring, that the industrial data satisfies the condition, sending, by the system, a work order instruction to a work order management system, the work order instruction instructing the work order management system to generate a work order for performing a maintenance task to address the performance issue.

Also, according to one or more embodiments, a non-transitory computer-readable medium is provided having stored thereon instructions that, in response to execution, cause a system executing on a cloud platform and comprising a processor to perform operations, the operations comprising receiving, via a cloud platform, industrial data from a gateway device that collects the industrial data from industrial devices associated with an industrial machine; monitoring the industrial data for a condition indicative of a performance issue of the industrial machine; and in response to determining, based on the monitoring, that the industrial data satisfies the condition, sending a work order instruction to a work order management system, the work order instruction instructing the work order management system to generate a work order for performing a maintenance task to address the performance issue.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
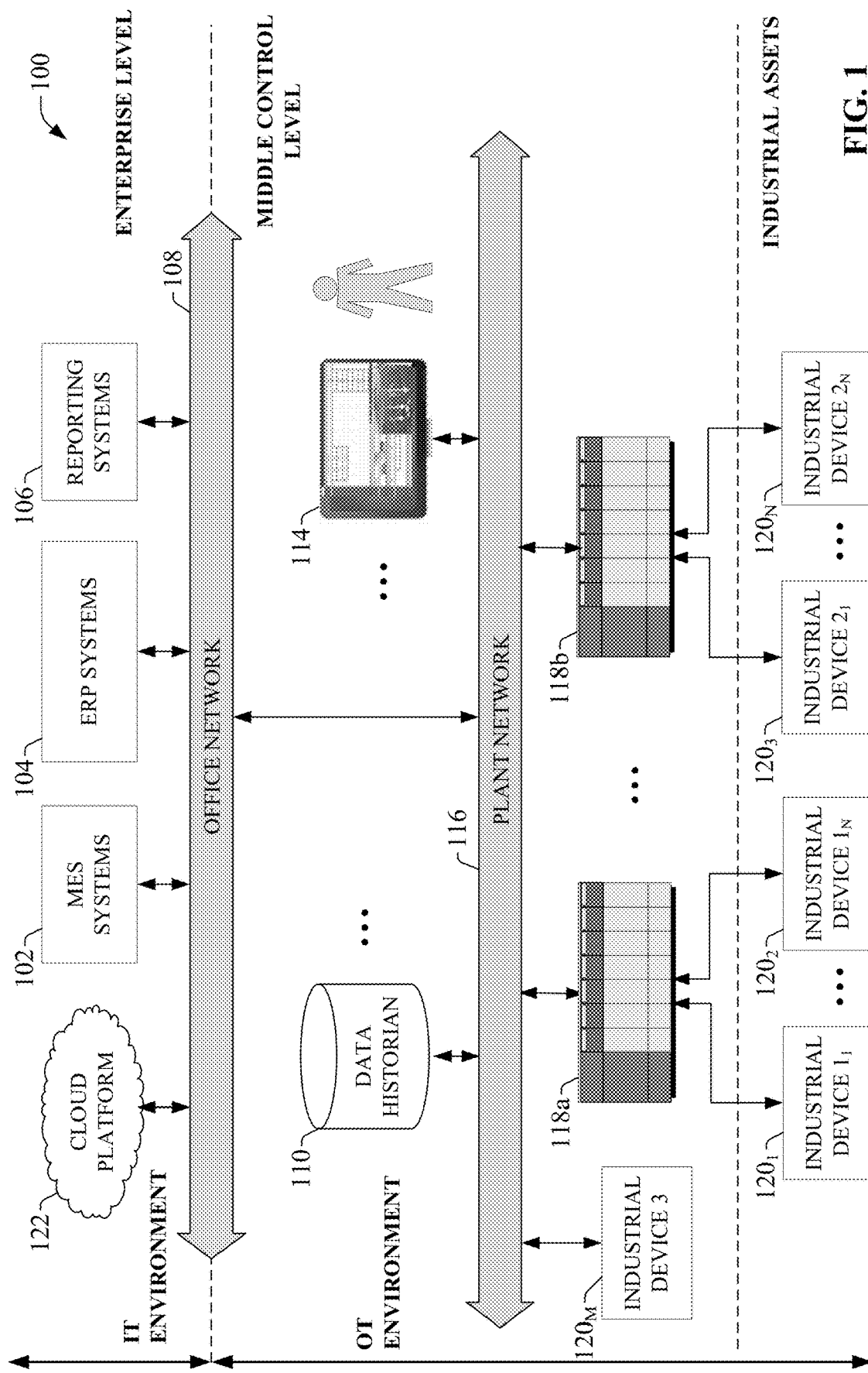
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer, on a server blade, or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, structured text, C++, Python, Javascript, etc.

Industrial devices 120 may include input devices that provide data relating to the controlled industrial systems to the industrial controllers 118, output devices that respond to control signals generated by the industrial controllers 118 to control aspects of the industrial systems, or devices that act as both input and output devices. Example input devices can include telemetry devices (e.g., temperature sensors, flow meters, level sensors, pressure sensors, etc), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired connections or over wired or wireless networks. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, EtherNet/IP, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. Such higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level given higher-level business considerations. Reporting systems 106 can collect operational data from industrial devices on the plant floor and generate daily or shift reports that summarize operational statistics of the controlled industrial assets.

Industrial facilities typically house and operate many industrial assets, machines, or equipment. Many of these assets require regular proactive maintenance to ensure continued optimal operation, in addition to unplanned repair operations to address unexpected downtime events, such as machine malfunctions. To manage the large number of maintenance operations carried out at a given industrial enterprise, work order management systems can be used to initiate work orders for new maintenance operations to be performed, to track the statuses of these work orders, and to keep a record of maintenance operations performed within the plant. In a typical scenario, when metered performance data—e.g., vibration values, temperature values, product counts, etc.—indicates a possible performance concern requiring investigation or maintenance, a maintenance technician or manager creates and submits a work order for the maintenance operation to the work order management system. Maintenance personnel are then assigned the task of performing the maintenance task or investigation. As the work is carried out, maintenance actions performed in connection with the schedule maintenance task are submitted and recorded with the work order, which remains open as its corresponding maintenance task is performed. The work order is then closed once the task is completed.

This approach to maintenance management requires operators, maintenance staff, or supervisors to visually observe when machine performance indicators necessitate scheduling of a maintenance action and creation of a corresponding work order for the maintenance task. If a performance concern is observed, the work order must then be created by a maintenance supervisor or technician so that the maintenance work is properly logged and tracked. The process of manually creating and submitting work orders is susceptible to errors due to improperly entered work order information. Errors in the work order submission process are common, and these errors may have associated risks that directly affect the underlying industrial assets on which maintenance is performed, or that adversely affect future decisions made by the industrial enterprise.

To address these and other issues, one or more embodiments described herein provide an architecture that automates the process of creating work orders using monitored data generated by the industrial assets. In one or more embodiments, an industrial gateway device can collect control, status, and/or operational data from industrial devices on the plant floor and feed this data to a cloud-based monitoring system. The monitoring system initiates creation of work orders on a work order management system based on a determination that the monitored industrial data indicates a possible performance concern requiring investigation or maintenance. In some embodiments, machine-specific asset models maintained on the monitoring system define which data items on the industrial devices are to be monitored, as well as the conditions of this data that are to trigger work order creation.

In some embodiments, the monitoring system that monitors and analyzes the industrial data for actionable performance concerns can be part of a cloud-based industrial information hub (IIH) system that serves as a multi-participant ecosystem for equipment owners, equipment vendors, and service providers to exchange information and services.

Figure 2:
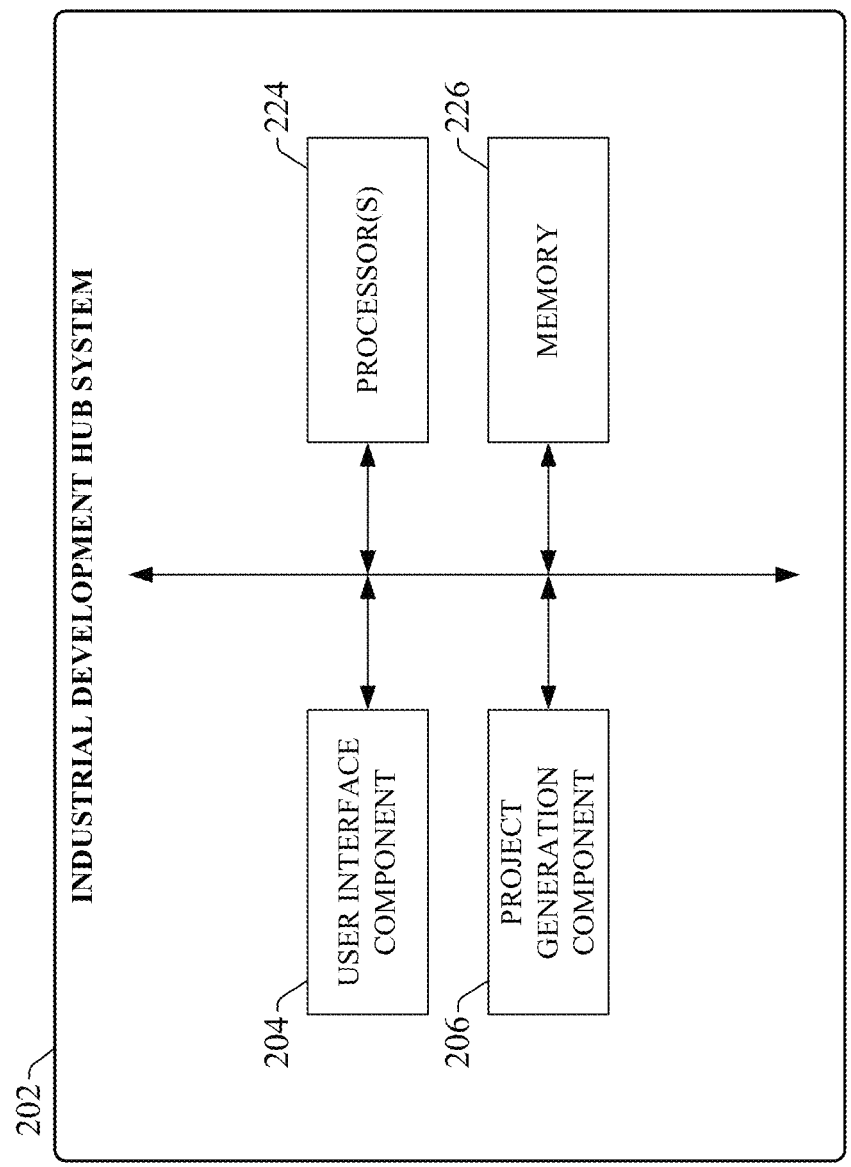
FIG. 2 is a block diagram of an example industrial development hub (IDH) system.

Some of the industrial devices from which industrial data is collected and analyzed can be programmed using an Industrial Development Hub (IDH) that offers development and testing capabilities to customers as a service. FIG. 2 is a block diagram of an example industrial development hub (IDH) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDH system 202 can include a user interface component 204, a project generation component 206, one or more processors 224, and memory 228. In various embodiments, one or more of the user interface component 204, project generation component 206, the one or more processors 224, and memory 226 can be electrically and/or communicatively coupled to one another to perform one or more of the functions of the IDH system 202. In some embodiments, components 204 and 206, can comprise software instructions stored on memory 226 and executed by processor(s) 224. IDH system 202 may also interact with other hardware and/or software components not depicted in FIG. 2. For example, processor(s) 224 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to communicatively interface with a client device (e.g., a laptop computer, tablet computer, smart phone, etc.) that is communicatively connected to the IDH system 202 (e.g., via a hardwired or wireless connection). The user interface component 204 can then serve an IDH interface environment to the client device, through which the system 202 receives user input data and renders output data. In other embodiments, user interface component 204 can be configured to generate and serve suitable interface screens to the client device (e.g., program development screens, project submission screens, analysis result screens, etc.), and exchange data via these interface screens. Input data that can be received via various embodiments of user interface component 204 can include, but is not limited to, programming code (including industrial control programming, such as ladder logic programming), device configuration data, engineering drawings, HMI applications, or other such input. Output data rendered by various embodiments of user interface component 204 can include program code, programming feedback (e.g., error and highlighting, coding suggestions, etc.), control project telemetry and recommendations, project testing results, etc.

Project generation component 206 can be configured to create a control system project comprising one or more project files based on design input received via the user interface component 204, as well as industrial knowledge, predefined code modules, and asset models maintained by the IDH system 202. The control system project can comprise one or more of industrial control code (e.g., ladder logic, structured text, function block diagrams, etc.), HMI applications comprising one or more HMI interface screen definitions, device configuration files, or other such project files.

The one or more processors 224 can perform one or more of the functions described herein with reference to the systems and/or methods disclosed. Memory 226 can be a computer-readable storage medium storing computer-executable instructions and/or information for performing the functions described herein with reference to the systems and/or methods disclosed.

Figure 3:
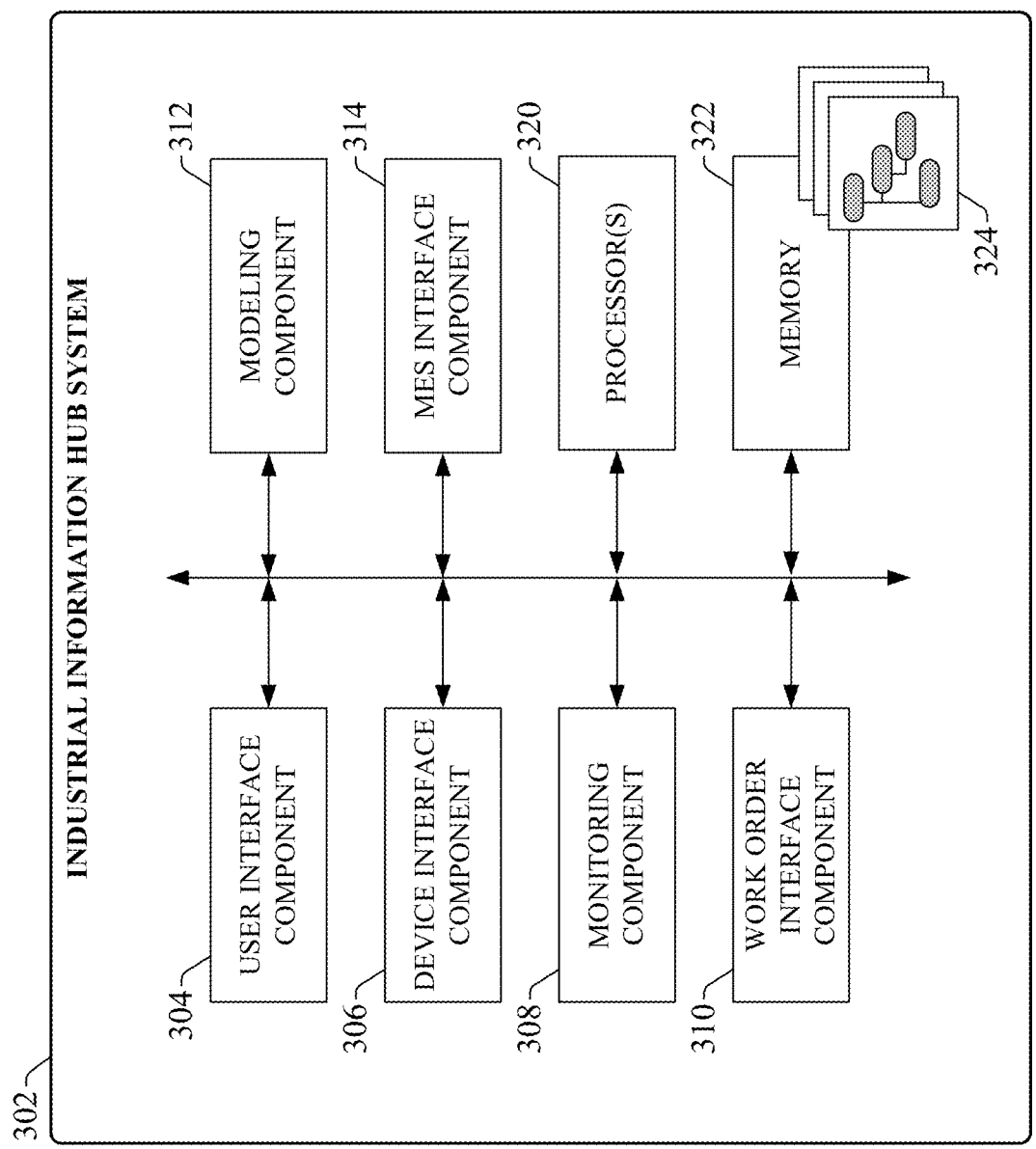
FIG. 3 is a block diagram of an example industrial information hub (IIH) system.

In some embodiments, the monitoring system that monitors and analyzes industrial data for actionable performance concerns can be part of a cloud-based industrial information hub (IIH) system that serves as a multi-participant ecosystem for equipment owners, equipment vendors, and service providers to exchange information and services. FIG. 3 is a block diagram of an example industrial information hub (IIH) system 302 according to one or more embodiments of this disclosure. IIH system 302 can include a user interface component 304, a device interface component 306, a monitoring component 308, a work order interface component 310, a modeling component 312, an MES interface component 314, one or more processors 320, and memory 322. In various embodiments, one or more of the user interface component 304, device interface component 306, monitoring component 308, work order interface component 310, modeling component 312, MES interface component 314, the one or more processors 320, and memory 322 can be electrically and/or communicatively coupled to one another to perform one or more of the functions of the IIH system 302. In some embodiments, components 304, 306, 308, 310, 312, and 314 can comprise software instructions stored on memory 322 and executed by processor(s) 320. IIH system 302 may also interact with other hardware and/or software components not depicted in FIG. 3. For example, processor(s) 320 may interact with one or more external user interface devices, such as a keyboard, a mouse, a display monitor, a touchscreen, or other such interface devices.

User interface component 304 can be configured to receive user input and to render output to the user in any suitable format (e.g., visual, audio, tactile, etc.). In some embodiments, user interface component 304 can be configured to communicatively interface with a client device (e.g., a laptop computer, tablet computer, smart phone, etc.) that is communicatively connected to the IIH system 302 (e.g., via a hardwired or wireless connection). The user interface component 304 can then serve an IIH interface environment to the client device, through which the system 302 receives user input data and renders output data. In other embodiments, user interface component 304 can be configured to generate and serve suitable interface screens to the client device (e.g., asset model development screens, work order display screens, etc.), and exchange data via these interface screens.

Device interface component 306 can be configured to interface with industrial devices or assets on the plant floor, either directly or via a gateway or edge device, and receive real-time operational and status data from these assets for the purposes of asset health monitoring.

Monitoring component 308 can be configured to monitor specified sets of the collected industrial data for conditions indicative of a performance issue requiring investigation or maintenance. In some embodiments, the sets of industrial data to be monitored, as well as the conditions of this data that indicate a performance concern that requires a work order to be opened, can be defined by machine-specific asset models 324 for the industrial equipment being monitored.

Work order interface component 310 can be configured to communicatively interface with a work order management system and to send an instruction to open a new work order in response to a determination by the monitoring component 308 that a subset of the monitored data satisfies a condition defined by a corresponding asset model 324.

Modeling component 312 can be configured to generate digital asset models or device models based on modeling input submitted by a user via the user interface component 304. MES interface component 314 can be configured to interface with a manufacturing execution system (MES) and to initiate transmission of notifications to appropriate personnel via the MES in conjunction with generation of work orders. The MES interface component 314 can also retrieve information from the MES system that can be used in connection with work order creation.

The one or more processors 320 can perform one or more of the functions described herein with reference to the systems and/or methods disclosed. Memory 322 can be a computer-readable storage medium storing computer-executable instructions and/or information for performing the functions described herein with reference to the systems and/or methods disclosed.

IIH system 302 can be implemented on a cloud platform as a set of cloud-based services to facilitate access by a diverse range of users having business or technical relationships, including industrial equipment owners (e.g., industrial enterprise entities or plant owners), equipment vendors, original equipment manufacturers (OEMs), system integrators, or other such user entities. The cloud platform on which the system 302 executes can be any infrastructure that allows shared computing services to be accessed and utilized by cloud-capable devices. The cloud platform can be a public cloud accessible via the Internet by devices having Internet connectivity and appropriate authorizations to utilize the IIH services. In some scenarios, the cloud platform can be provided by a cloud provider as a platform-as-a-service (PaaS), and the IIH system 302 can reside and execute on the cloud platform as a cloud-based service. In some such configurations, access to the cloud platform and associated IIH services can be provided to customers as a subscription service by an owner of the IIH system 302. Alternatively, the cloud platform can be a private cloud operated internally by the industrial enterprise (the owner of the plant facility). An example private cloud platform can comprise a set of servers hosting the IIH system 302 and residing on a corporate network protected by a firewall.

Figure 4:
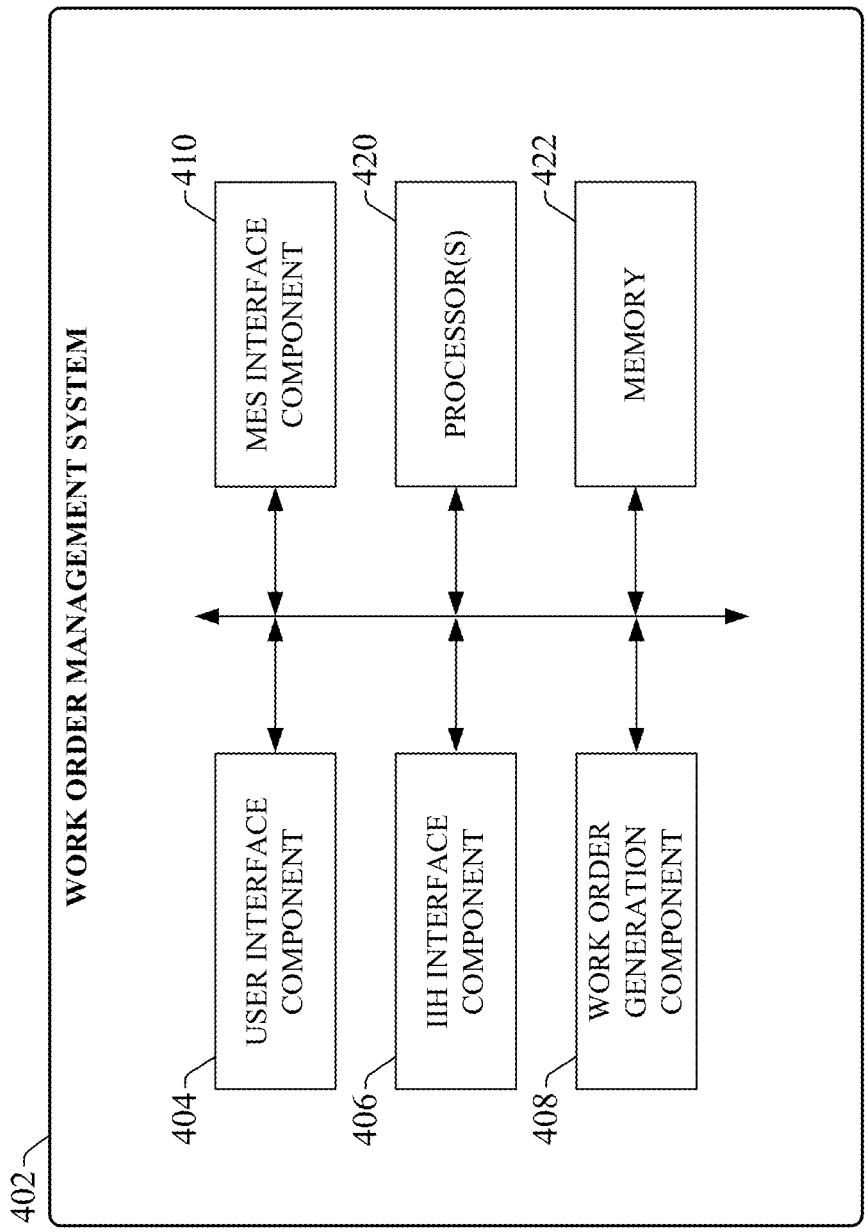
FIG. 4 is a block diagram of an example work order management system.

FIG. 4 is a block diagram of an example work order management system 402 according to one or more embodiments. Work order management system 402 can include a user interface component 404, an IIH interface component 406, a work order generation component 408, an MES interface component 410, one or more processors 420, and memory 422. In various embodiments, one or more of the user interface component 404, IIH interface component 406, work order generation component 408, MES interface component 410, the one or more processors 420, and memory 422 can be electrically and/or communicatively coupled to one another to perform one or more of the functions of the work order management system 402. In some embodiments, components 404, 406, 408, and 410 can comprise software instructions stored on memory 422 and executed by processor(s) 420. Work order management system 402 may also interact with other hardware and/or software components not depicted in FIG. 4. For example, processor(s) 420 may interact with one or more external user interface devices, such as a keyboard, a mouse, a display monitor, a touchscreen, or other such interface devices.

User interface component 404 can be configured to receive user input and to render output to the user in any suitable format (e.g., visual, audio, tactile, etc.). In some embodiments, user interface component 404 can be configured to interface with a client device (e.g., a laptop computer, tablet computer, smart phone, etc.) that is communicatively connected to the work order management system 402 (e.g., via a hardwired or wireless connection). Output data that can be rendered by the user interface component 404 can include work order information for open and closed work orders, notification data informing users that a work order for a newly discovered maintenance concern has been opened, or other such information.

IIH interface component 406 can be configured to communicatively interface with the IIH system 302 via a cloud platform, and to receive instructions to generate work orders from the IIH system 302. Work order generation component 408 can be configured to generate work orders in accordance with instructions received from the IIH system 302. MES interface component 410 can be configured to interface with an MES system and to initiate transmission of notifications to appropriate personnel via the MES in conjunction with generation of work orders. The MES interface component 410 can also retrieve information from the MES system that can be used by the work order generation component 408 in connection with work order creation.

The one or more processors 420 can perform one or more of the functions described herein with reference to the systems and/or methods disclosed. Memory 422 can be a computer-readable storage medium storing computer-executable instructions and/or information for performing the functions described herein with reference to the systems and/or methods disclosed.

Figure 5:
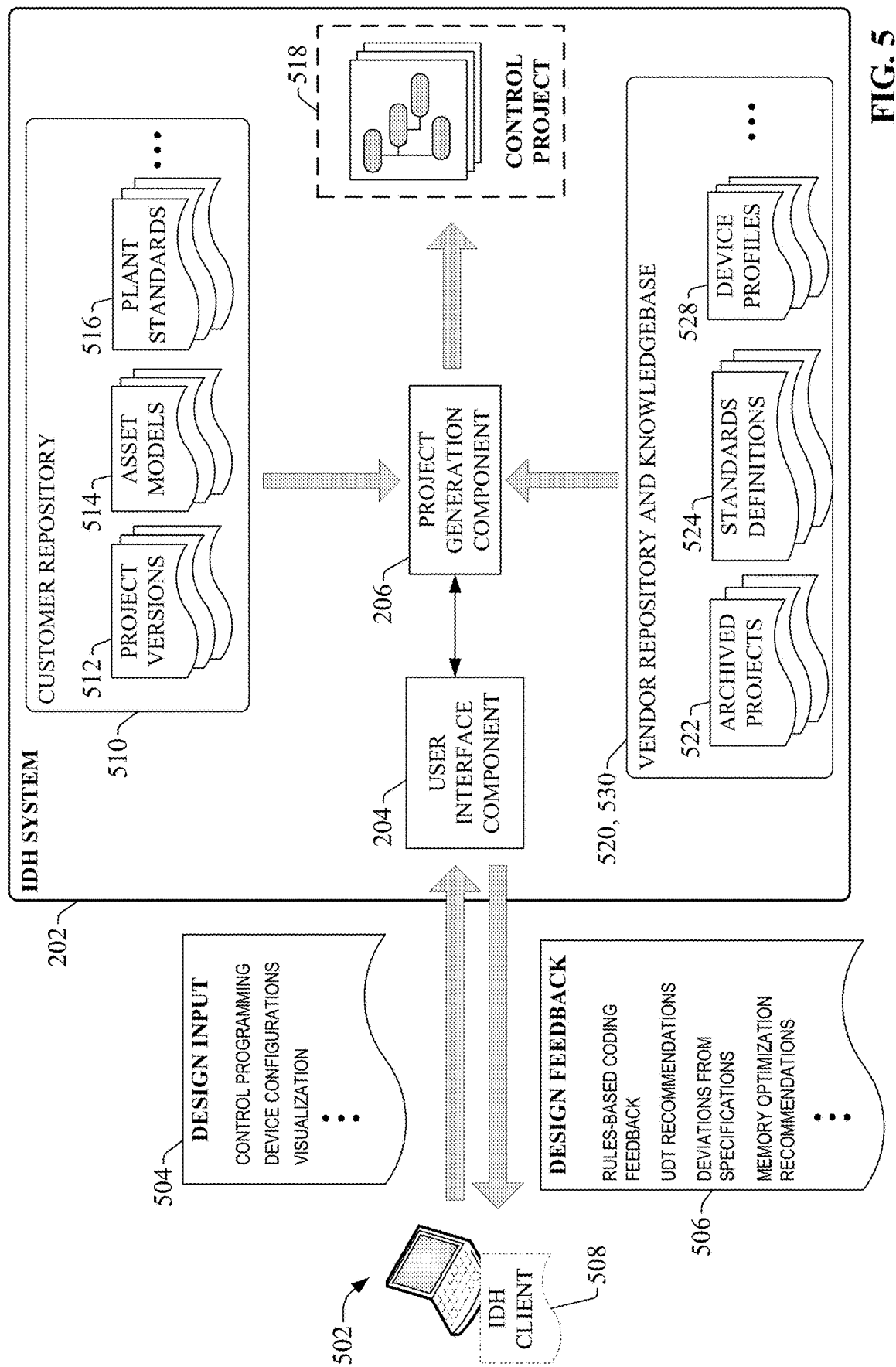
FIG. 5 is a diagram illustrating a generalized architecture of an IDH system.

As noted above, some of the industrial devices that are monitored for the purpose of automated work order generation can be programmed using IDH system 202. FIG. 5 is a diagram illustrating a generalized architecture of the IDH system 202 according to one or more embodiments. Although examples described herein assume that the monitored industrial devices have been programmed using IDH system 202, it is to be appreciated that the monitoring and work order generation architecture described herein is not limited to industrial devices programmed using system 202. In general, the architecture described herein for automatically generating work orders can monitor substantially any industrial device or asset for which real-time performance or operational data is available, independently of the type of development platform used to program those devices.

IDH system 202 can execute on a cloud platform as a set of cloud-based storage, analysis, and project editing services. A client device 502 (e.g., a laptop computer, tablet computer, desktop computer, mobile device, wearable AR/VR appliance, etc.) can access the repository system's project development and analysis tools and leverage these tools to either upload or create a control project 518 for an automation system being developed. To this end, the system's user interface component 204 can remotely serve an IDH client 508 to the client device 502. The IDH client 508 comprises a number of interface displays that serve as an interface to the system 202.

Client device 502 can access and use the IDH system's project development tools and to create a control project 518 for an automation system being developed. Control project 518 may include industrial controller code, (e.g., control logic, structured text, sequential function charts, etc.), device configuration files or parameter settings, HMI applications defining HMI screens or AR/VR visualizations for visualizing the automation system's operation, or other such aspects of a control project.

To facilitate project development, user interface component 204 can serve development interface displays to the client device 502 that allow a user to submit design input 504 to the IDH system 202 in various supported formats, including but not limited to control programming for execution on an industrial controller, device configuration settings to be downloaded to respective industrial devices (e.g., motor drives, sensors, industrial controllers, etc.), HMI screen development data, or other such design input 504. Based on this design input 504, project generation component 206 generates a control project 518 comprising one or more of compiled controller code, device configuration data, HMI application files, or other such executable control project data that can be deployed and executed on the appropriate industrial devices to carry out the programmed control functions.

During development of the control project 518, project generation component 206 can generate design feedback 506 intended to assist the developer in connection with developing and optimizing the control project 518. This design feedback 506 can be rendered by the user interface component 204 as real-time feedback to the designer. This design feedback 506 can be generated based on analysis of the design input 504 itself, as well as customer-specific and vendor-specific information stored in a customer repository 510 and a vendor repository 520 maintained on the IDH system 202. Feedback can also be generated based on general industrial expertise stored in a knowledgebase 530.

For example, as the designer is entering control code to be compiled and executed on an industrial controller, project generation component 206 can perform code analysis on the code and provide recommendations, notifications, or predictions based on the analysis relative to a variety of code or project quality metrics. This analysis can include determining whether the control code conforms to the engineering standards and practices used at the plant facility for which the code is being developed. To aid in this analysis, engineers at the plant facility can submit control code standards definitions defining the coding standards that all control code is expected to adhere to before being permitted to execute within the plant facility. These coding standards can be stored in the customer's repository 510 as plant standards 516 and can be referenced by the project generation component 206 to determine whether the submitted control code is in conformance with plant standards.

In some embodiments, project generation component 206 can also compare control code submitted as part of the design input 504 with previously submitted control code—stored as archived project versions 512—for the same control project or for different control projects developed by the same customer. Based on analysis of other control code submitted by the customer and archived in the customer repository 510, project generation component 206 can learn or infer typical coding styles or design approaches used by that customer. Based on these learned customer programming preferences, the project generation component 206 can identify when the control programming being submitted as part of design input 504 deviates from either the plant's preferred coding practices or the plant's preferred manner of controlling certain industrial operations, and generate design feedback 506 notifying of these deviations and recommending alternative control coding that will bring the current project into conformity with previous design strategies.

Project generation component 206 can also reference vendor-specific equipment or device data stored in one or more vendor repositories 520 to predict whether the user's submitted design input 504 will cause equipment integration or compatibility issues. This determination can be based, for example, on device profiles 528 submitted by the equipment vendor. Each device profile 528 may comprise digital specification data for a given device, and may also record known compatibility issues for the device. Using this information, project generation component 206 can assess the submitted design input 504 to determine whether any portion of the submitted control programming or device configurations will result in a performance or integration issue given known limitations of one or more devices.

Figure 6:
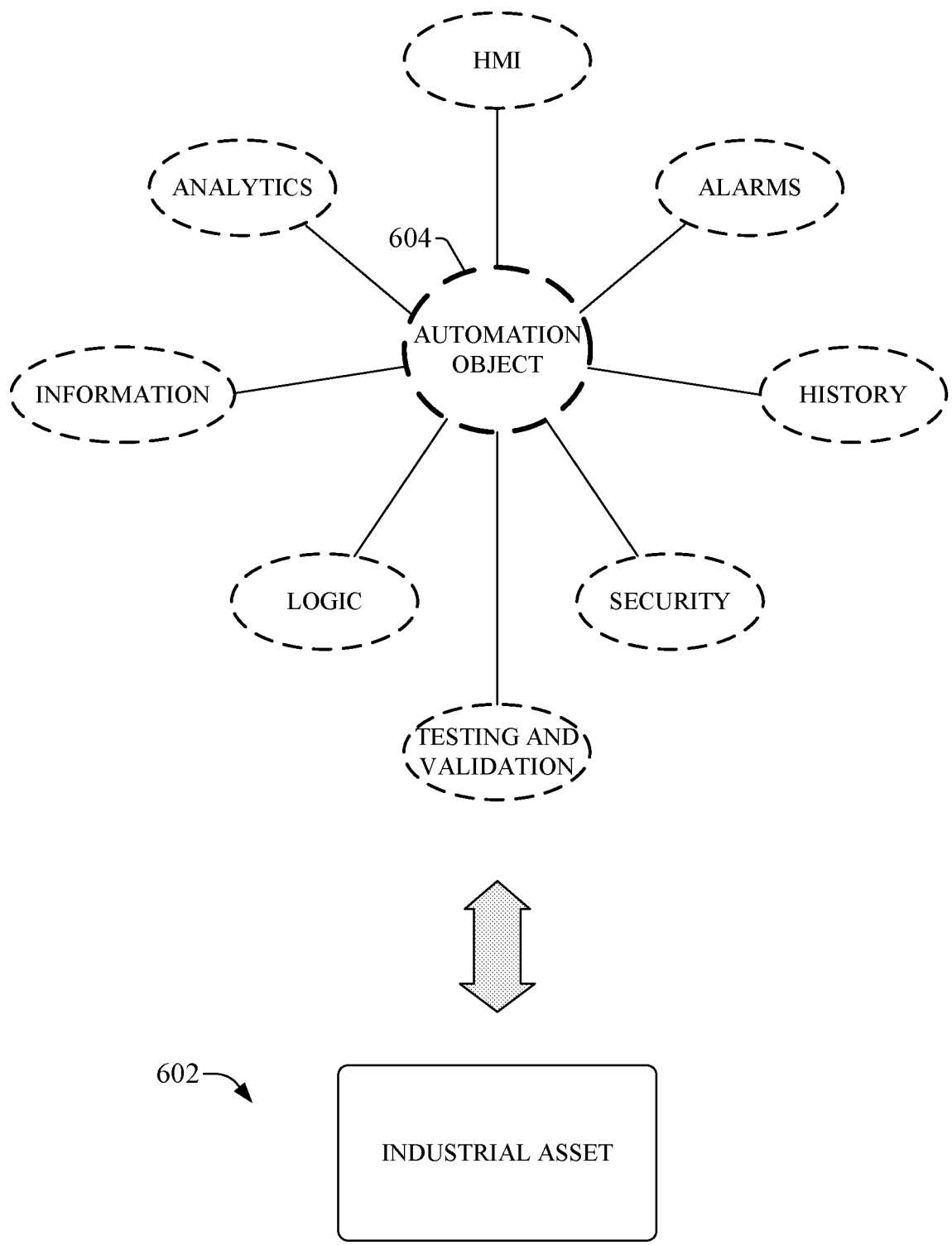
FIG. 6 is a diagram illustrating example automation object properties that can be leveraged in connection with building, deploying, and executing a control project.

To support enhanced development capabilities, some embodiments of IDH system 202 can support control programming that is based on an object-based data model rather than, or in addition to, a tag-based architecture. Automation objects can serve as the building block for this object-based development architecture. FIG. 6 is a diagram illustrating several example automation object properties that can be leveraged by the IDH system 202 in connection with building, deploying, and executing a control project 518. Automation objects 604 can be created and augmented during design, integrated into larger data models, and consumed during runtime. These automation objects 604 provide a common data structure across the IDH system 202 and can be stored in an object library (e.g., part of memory 226) for reuse. The object library can store predefined automation objects 604 representing various classifications of real-world industrial assets 602, including but not limited to pumps, tanks, valves, motors, motor drives (e.g., variable frequency drives), industrial robots, actuators (e.g., pneumatic or hydraulic actuators), or other such assets. Automation objects 604 can represent elements at substantially any level of an industrial enterprise, including individual devices, machines made up of many industrial devices and components (some of which may be associated with their own automation objects 604), and entire production lines or process control systems.

An automation object 604 for a given type of industrial asset can encode such aspects as 2D or 3D visualizations, alarms, control coding (e.g., logic or other type of control programming), analytics, startup procedures, testing protocols and scripts, validation procedures and reports, simulations, schematics, security protocols, and other such properties associated with the industrial asset 602 represented by the object 604. Automation objects 604 can also be geotagged with location information identifying the location of the associated asset. During runtime of the control project 518, some types of automation objects 604 can also record status or operational history data for their corresponding industrial asset. In general, automation objects 604 serve as programmatic representations of their corresponding industrial assets 602 and can be incorporated into a control project 518 as elements of control code, a 2D or 3D visualization, a knowledgebase or maintenance guidance system for the industrial assets, or other such aspects.

An automation object 604 corresponding to an industrial asset 602 can define a logical grouping of data items that store digital and/or analog data values relating to operation of the asset 602. For example, an automation object 604 representing a valve can have properties that serve as data containers for the valve's current open or closed state, a metered flow rate of fluid through the valve, or other such valve properties. Similarly, an automation object 604 representing a motor can have properties corresponding to the motor's current speed, torque, fault status, current, or other such operational and status information. In contrast to individual data tags, an automation object's logical arrangement of data relating to its corresponding real-world asset can be leveraged by external systems to build analytics without the need for a control programmer to decipher the meaning of the data.

In some embodiments, automation objects 604 can also define work order configuration information for its corresponding asset 602, including but not limited to data tags or values associated with the asset 602 that should be monitored for the purpose of identifying one or more performance concerns for which a maintenance action should be initiated, as well as values of these data tags that are to initiate the maintenance action.

Completed control projects 518—either developed using the IDH system's project editing tools as described above in connection with FIG. 5 or using separate development platforms (e.g., ladder logic development platforms, HMI application development platforms, device configuration applications, etc.)— can be compiled into executable code that can then be deployed to and executed on the appropriate industrial devices (e.g., industrial controllers 118, motor drives, HMI terminals 114, etc.) to facilitate monitoring and control of an industrial automation system.

Figure 7:
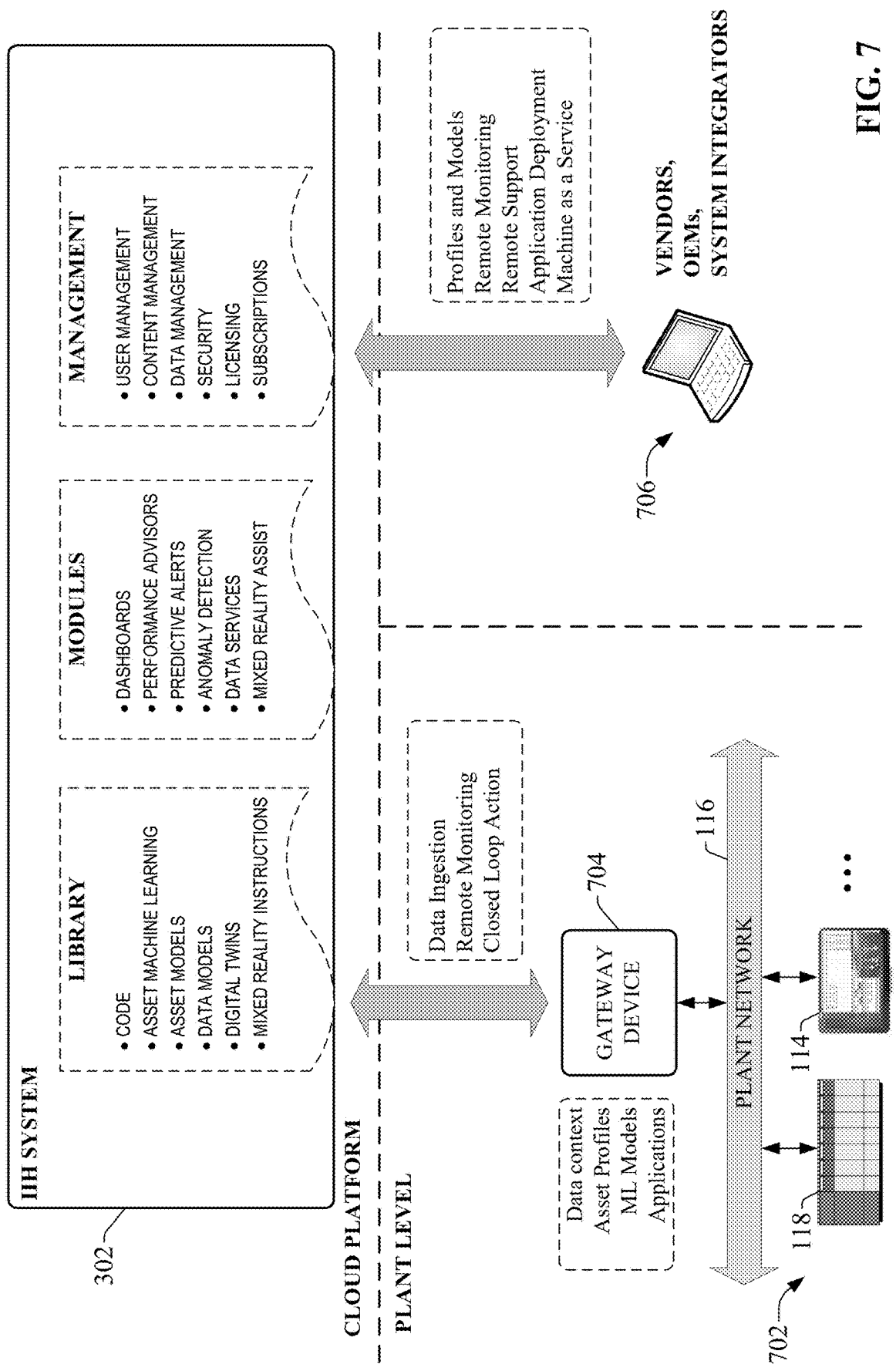
FIG. 7 is a generalized conceptual diagram of the ecosystem facilitated by an IIH system.

Once industrial devices at a plant facility have been programmed, configured, and commissioned for operation—either using IDH system 202 or another type of control code development platform—real-time and historical data generated by the industrial devices or associated meters during operation can be fed to a cloud-based IIH system 302, which can provide owners of the industrial assets additional value and insights into their plant floor operations. FIG. 7 is a generalized conceptual diagram of the ecosystem facilitated by the IIH system 302. In general, the IIH system 302 supports a cloud-based environment and associated tools that allows vendors, OEMs, system integrators, or other industrial service providers to create and deploy digital services for use by owners of industrial devices 702 at plant facilities (e.g., industrial controllers, motor drives, telemetry devices, safety relays, HMI terminals, etc.). The IIH system 302 can provide a number of capabilities, including standardized easy connectivity solutions to move information from industrial devices 702 to the cloud platform; common data models (asset models, data models, digital twins, asset machine learning models, etc.) to build and maintain context from multiple sources and reduce time to value; support for information-ready assets from OEMs with pre-built digital twins, machine learning models, analytics and mixed reality experiences; secure architectures that allow end users provide safe access to their OT devices 702 and information, and leverage domain expertise and content from the ecosystem; and a technology platform that enables ecosystem partners to deliver value and monetize services and for their customers to easily consume this value.

Each ecosystem partner can benefit from key outcomes by participation in the IIH ecosystem. For example, owners of industrial devices 702 will see improved operational efficiency and asset performance by leveraging data and insights, as well as higher returns on equipment investments and faster analytics rollouts through standardized deployments. OEMs will see new revenue streams throughout the lifecycle of their assets through remote monitoring, predictive maintenance, performance contracts, and "Machine as a Service" offerings. System integrators and independent software vendors (ISVs) will see rapid application development and lower integration costs from system simulation and validation.

To support a large number of diverse participants, the IIH system 302 can utilize trusted information connectivity sources to provide core asset-to-cloud connectivity, data governance, and access administration between end users and the ecosystem, including secure and validated architectures. These services can cover a wide spectrum of connectivity use cases, from completely on-premises and disconnected to intermittent and always connected. Addressing disconnected or intermittent connectivity use cases while proving the value of connectivity can accelerate digital maturity and remove barriers to cloud adoption.

The cloud infrastructure on which the IIH system 302 is built can provide components that enable the ecosystem to rapidly develop standardized and repeatable solutions, including native connectors, common data models for contextualization, data repositories or data lakes, digital twin profile builders, and pre-built machine learning reference solutions for critical use cases. These components can enable the ecosystem to deliver predictive maintenance, remote monitoring and automated work order generation, expert assistance, and digital workforce productivity (including AR and VR).

The IIH system 302 can also provide scalable compute offerings from the edge to the cloud, which operate in conjunction with a portfolio of hardware offerings that include simple gateway devices or smart gateway devices 704, data center, and cloud compute capabilities that offer the best of near machine, on-premises, and cloud compute capabilities. To realize these offerings, the IIH system 302 can interface with the industrial devices 702 via one or more gateway devices 704 that reside on a common network 116 with the industrial devices that monitor and control plant floor automation systems. These gateway devices 704 can migrate selected sets of data collected from industrial devices 702 to the IIH system 302, which leverages this data for the purposes of analytics, visualization, notifications, or other such services.

Figure 8:
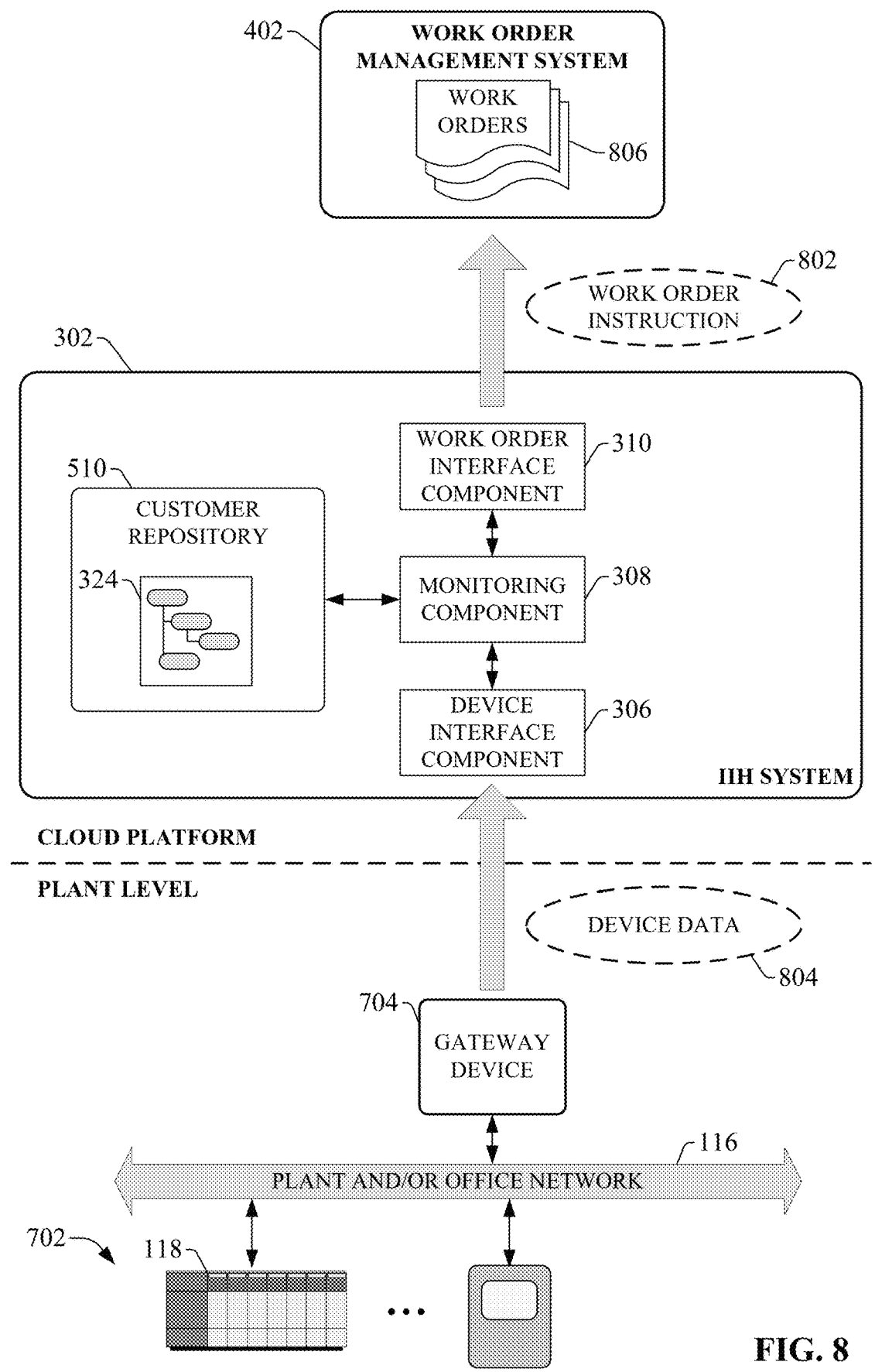
FIG. 8 is a diagram illustrating an example architecture for automatically generating work orders based on remote monitoring of industrial asset performance.

Among its supported services, some embodiments of IIH system 302 can interface with work order management systems 402 that are designed to create and track work orders for maintenance tasks, and initiate generation of work orders in response to detection of a possible maintenance concern. FIG. 8 is a diagram illustrating an example architecture for automatically generating work orders based on remote monitoring of industrial asset performance. In this example architecture, a gateway device 704 resides on the same plant network 116 as the industrial devices 702 associated with automation systems on the plant floor. These industrial devices 702 can include, for example, industrial controllers 118, motor drives, HMI terminals, telemetry devices (e.g., flow meters, pressure meters, temperature meters, etc.), or other such devices.

During automation system operation, gateway device 704 collects status and operational data 804 from these industrial devices, including data read from data tags or automation objects 604 defined on one or more industrial controllers 118. In some embodiments, gateway device 704 can contextualize the collected data 804 prior to delivering the data to the IIH system 302 and deliver the processed data to the repository system 302 as contextualized data. This contextualization can include time-stamping the data, as well as normalizing or otherwise formatting the collected data for analysis by the IIH system 302. In general, gateway device 704 serves as an edge device that interfaces data from the set of industrial devices 702 to the IIH system 302.

The IIH system's device interface component 306 remotely interfaces with the gateway device 704 to receive the collected device data 804, and a monitoring component 308 on the IIH system 302 monitors the device data 804 for conditions indicative of a possible performance issue that necessitates a maintenance action and creation of a corresponding work order. As will be discussed in more detail below, the specific data values that are monitored by the monitoring component 308, and the conditions of these data values that will trigger creation of a work order, can be defined in machine-specific or process-specific asset models 324 for the industrial machines being monitored. In a multi-customer ecosystem in which multiple customers have access to the services offered by the IIH system 302, these asset models 324 can be stored on the respective customer repositories 510 for access by the monitoring component 308.

When the monitoring component 308 determines that the monitored industrial data 804 satisfies a condition indicative of an asset performance issue requiring investigation or correction by maintenance personnel—as defined by the asset model 324—the IIH system's work order interface 310 sends a work order instruction 802 to a work order management system 402 that interfaces with the IIH system 302. In some architectures, the work order management system 402 can be a separate cloud-based system that provides maintenance management services to multiple industrial customers. Alternatively, work order management system 402 may be a private, customer-specific maintenance management system that resides and executes locally at an industrial facility, and which remotely interfaces with the IIH system 302 to automate scheduling of maintenance tasks and generation of work orders to record and track those tasks.

The condition detected by the monitoring component 308 that initiates work order creation can be, for example, a deviation of one or more data tag values that move outside a defined range of normal or expected ranges. In an example scenario, a baking process may require an oven temperature to stay within a defined temperature range. Accordingly, values of a data tag or automation object 604 corresponding to this oven temperature can be collected from the industrial controller 118 that monitors and controls the baking process, and this collected data can be provided to the IIH system 302 as part of the device data 804. The monitoring component 308 monitors this value to determine when the oven temperature deviates from this range and, in response to detecting such a deviation, instructs work order interface component 310 to send a work order instruction 802 that instructs the work order management system 402 to open a work order for investigation of the temperature control issue.

In some scenarios in which a given machine performance metric is a function of the current states of other performance metrics, the condition that triggers creation of a work order can be based on a holistic set of data value conditions rather than being based on deviation of a single data value. For example, an expected value of a given performance metric for a machine or automation system—e.g., a conveyor speed, an oven temperature, a fill level, etc.—may depend on the current operating mode of the machine, a speed or temperature of another machine component, or other such factors. The value of the performance metric may also be seasonal or time-specific, such that the expected value of the metric depends on a current time of day, a current day of the week, a current month of the year, or another time function. If the health of a machine or automation system is a function of whether concurrent values of multiple data tags or automation objects 604 are within an expected holistic value space, the monitoring component 308 can be configured to instruct the work order interface component 310 to generate a work order instruction 802 upon determining that these values are in a collective, concurrent state indicating a potential performance problem.

The work order instruction 802 can specify information about the maintenance task to be performed, including but not limited to an identity of the industrial asset or machine for which maintenance is required, an aspect of the machine that requires attention, a type of the maintenance to be performed, an estimated number of hours to be spent on the maintenance task, an estimated number of personnel to be assigned to the task, a description of the task, or other such information. In response to receipt of the work order instruction 802, work order management system 402 creates a work order 806 for the maintenance task, populating the work order with information provided by the work order instruction 802.

Work order management system 402 can also deliver notifications to relevant plant personal alerting those employees that the new work order 806 has been created. The notification can include a description of the work to be performed. The specific personnel to be assigned to the maintenance task—and to whom the notifications will be delivered—can be determined by the work order management system 402 based on customer-specific work schedules and employee qualifications defined on the system 402. Once created, the work order 806 can be managed through its lifecycle within the domain of the work order management system 402. This can include updating the status of the work order within the system 402 as the maintenance task is performed and ultimately closing the work order upon completion of the maintenance task.

As noted above, machine-specific asset models 324 can be used to instruct the monitoring component 308 as to the conditions that are to trigger creation of a work order 806. An asset model 324 for a given machine or automation system can be created by an OEM that built the machine, in-house engineers at the plant facility in which the machine operators, or by third-party service providers based on relevant industrial expertise. In general, asset models 324 can define asset events that are to trigger creation of a work order, and can also define maintenance work that is to be scheduled when the asset event occurs. These asset events can be defined as a function of values or ranges of values of data tags or automation objects 604 defined on industrial controllers 118 or other types of industrial devices 702.

In an example scenario, a machine builder such as an OEM may build and sell instances of a machine to multiple different industrial customers. The machine may include its own control cabinet in which an industrial controller 118 and associated power and control devices are housed, or may be designed to be integrated with a customer's existing control system by wiring the machine's I/O into the customer's industrial controller 118 and adding proprietary control code for the machine to the existing control programming. To facilitate integration of the machine with a work order management system via IIH system 302, the machine builder may also provide an instance an asset model 324 that has been designed for the machine. The asset model 324 can define one or more conditions of the machine that are to trigger scheduling of a maintenance task and creation of a corresponding work order in the work order management system 402. The asset model 324 can define each condition in terms of which data tags, automation objects 604, or other data items defined in the industrial controller are to be monitored to determine when the condition is true, as well as the values of these data sources that will trigger automated scheduling of the maintenance task.

In an example scenario, the asset model 324 may specify a data tag or a property of an automation object 604 corresponding to a particular performance metric of the machine—e.g., an oven temperature, a tank pressure, a flow rate, etc.—as well as a range of normal or expected values of the specified data tag or automation object property. The asset model 324 can also define particulars of the maintenance action that is to be performed if the value of the specified data tag or object property falls outside the defined range of expected values. This asset model 324 can be provide to a customer who purchases the machine, and can be uploaded to the customer repository 510 allocated to that customer for access by the monitoring component 308.

During operation of the machine, the device interface component 306 instructs the gateway device 704 to stream the value of the specified data tag to the IIH system 302 in accordance with the asset model 324, and the monitoring component 308 will monitor the value to determine whether the performance metric satisfies the condition for scheduling the maintenance action defined in the asset model 324. When the monitored value satisfies the maintenance condition, the work order interface 310 generates and sends the work order instruction 802 to the work order management system 402. Information contained in the work order instruction 802—e.g., the asset to be investigated, a type of maintenance to perform on the asset, etc.—can be set based on the type of maintenance action defined in the asset model 324.

Figure 9:
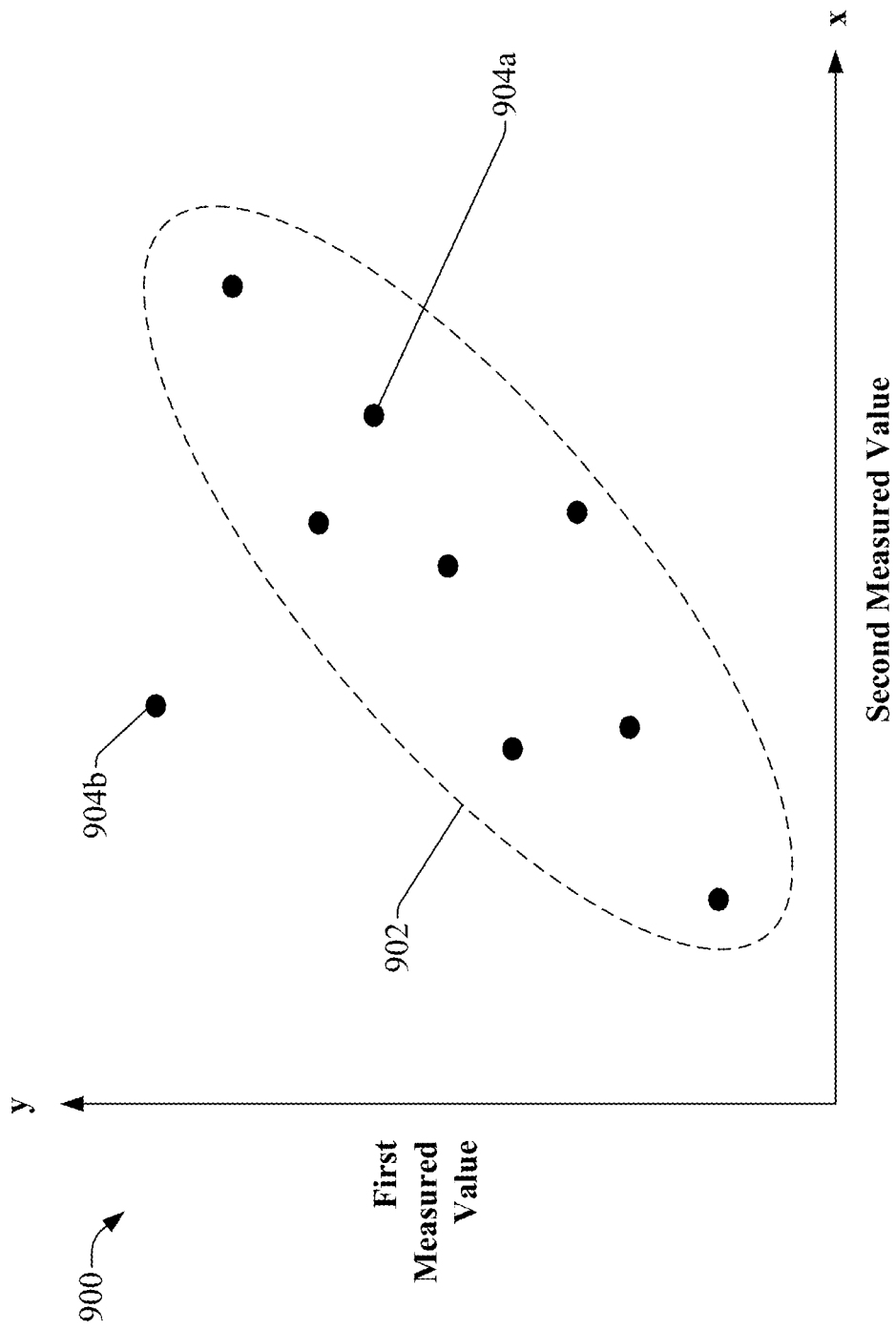
FIG. 9 is an example two-dimensional graph that plots a first measured value as a function of a second measured value.

Asset models 324 can also define more complex conditions for triggering a maintenance action, which may require a determination of whether a set of concurrent values of multiple monitored data tags or automation objects deviate from an expected multi-dimensional value space. In this regard, it may be known that normal or expected values of a first monitored performance metric—e.g., a temperature, a pressure, a fill level, etc.—depends on the concurrent value of one or more other data items read from the industrial devices 702, such as the operating mode of the machine, a conveyor speed, or other such machine states. In such scenarios, the asset model 324 can define a maintenance condition in terms of an expected multi-dimensional value space of the relevant data values. FIG. 9 is an example two-dimensional graph 900 that plots a first measured value as a function of a second measured value, where the first and second measured values are received at the IIH system as part of device data 804. In this example, the first measured value is plotted on the y-axis, and the second measured value is plotted on the x-axis. Each plot point 904 on the graph 900 corresponds to a point in time and represents the value pair of the first and second measured values at that point in time.

In general, there may be a broad correlation between the first measured value and the second measured value, and it may be known that the relationship between the first and second measured values will fall within the space defined by oval 902 during normal operation of the machine. That is, if the first measured value is plotted against the concurrent second measured value on graph 900 for a given point in time, the resulting plot point—e.g., plot point 904a— should fall within oval 902 when the machine is operating normally. Based on this knowledge, the asset model 324 may define that a maintenance task should be scheduled if the value pair for the first and second measure values falls outside the feature space defined by oval 902, as in the case with the value pair represented by plot point 904b.

Although the example illustrated in FIG. 9 depicts a combination of only two value pairs, an asset model 324 may define a maintenance condition as a function of more than two data tags or automation object properties. In such scenarios, the feature space 902 for a given maintenance condition can be defined by the asset model 324 as a multi-dimensional feature space having a number of dimensions corresponding to the number of data tags or values to be monitored for that maintenance condition.

Figure 10:
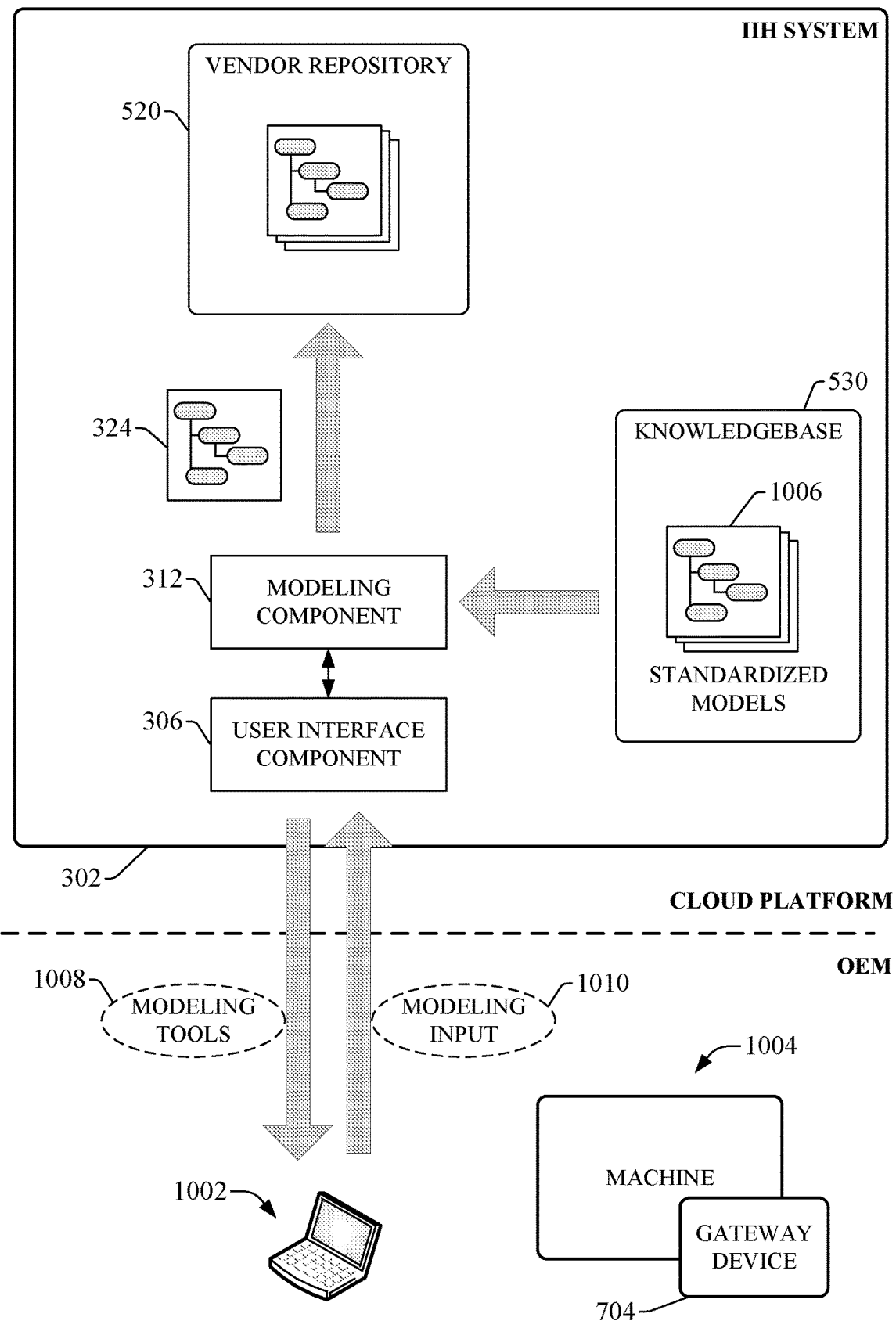
FIG. 10 is a diagram illustrating creation and registration of an asset model by an OEM for a machine being built for delivery to a customer.

The IIH system 302 provides development tools that allow asset models 324 to be created, registered, and tied to an industrial asset or machine, either by a customer, an OEM, or another participant of the ecosystem. FIG. 10 is a diagram illustrating creation and registration of an asset model 324 by an OEM for a machine 1004 being built for delivery to a customer. Asset models 324 can be developed using the IIH system's data modeling services and made available to purchasers of the machine 1004 from the OEM's vendor repositor 520. To this end, the IIH system's modeling component 312 can generate and serve (via user interface component 304) model development interfaces to client devices 1002 associated with the OEM. Designers can submit modeling input 1010 via interaction with modeling tools 1008 provided by these development interfaces. These modeling tools 1008 allow OEM designers to define one or more asset models 324 to be associated with the machine 1004 being built or offered for sale. These asset models 324 can then be leveraged by the purchaser of the machine 1004 for the purpose of interfacing the machine with a work order management system 402.

In some embodiments, modeling component 312 can allow the designer to select and incorporate predefined standardized models 1006 into the asset model 324. These standardized models 1006 can be stored on knowledgebase 530 and can encode known maintenance actions, as well as the relevant performance metrics that should be monitored to determine when these actions should be triggered, for various types of industrial assets. Maintenance actions defined in the standardized models 1006 can reflect industrial expertise regarding their corresponding industrial assets. Developers of asset models 324 can select a standardized model 1006 corresponding to a category of industrial asset to which the machine 1004 belongs, and adapt this standardized model 1006 as needed to the specific machine 1004 (e.g., by mapping generic performance metrics defined in the standardized model 1006 to specific data tags or automation object properties defined in the machine's industrial controller 118). The resulting asset model 324 can then be stored in the vendor repository 520 for access and use by purchasers of machine 1004.

Figure 11:
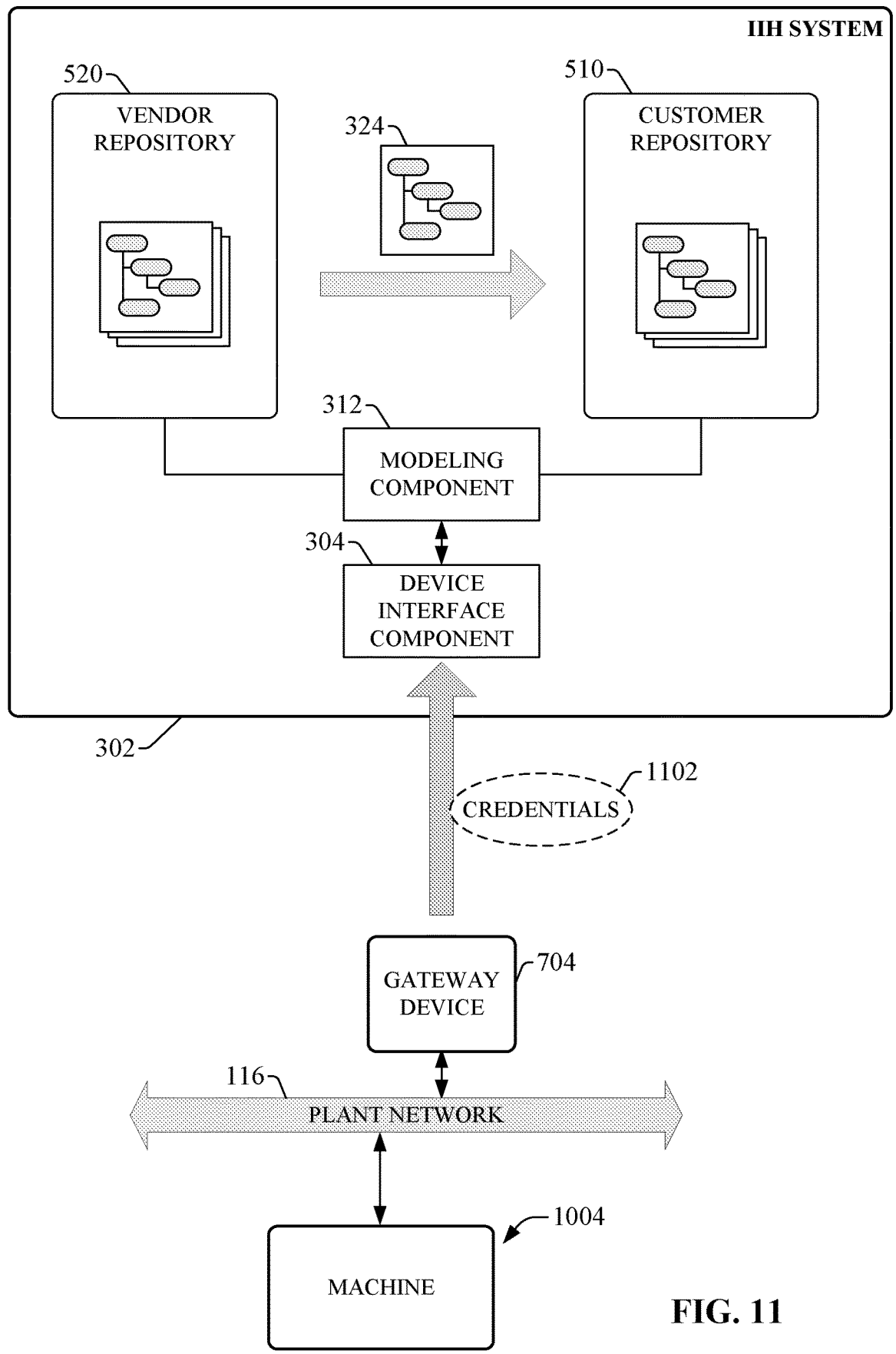
FIG. 11 is a diagram illustrating an example technique for commissioning an asset model.

Once the asset model 324 for the machine 1004 is made available in the vendor repository 520, a purchaser of the machine 1004 can obtain and commission the asset model 324 to facilitate integrating the machine 1004 with a work order management system 402. FIG. 11 is a diagram illustrating an example technique for commissioning the asset model 324. Once the machine has been installed at the customer's facility, personnel at the plant facility may choose to utilize the automated work order management services that are available for the machine 1004 and made possible by the IIH system 302. Accordingly, the gateway device 704 can communicatively connect to the cloud platform and send credentials 1102 for the machine 1004 to the IIH system 302. The credentials 1102 may be provided to the customer with the machine 1004 and can be used to identify the machine 1004 to the IIH system 302. Upon validating the credentials 1102, the modeling component 312 of the IIH system 302 provisions the asset model 324 for the machine 1004 to the customer. This may involve, for example, provisioning the asset model 324 from the vendor repository to the customer repository 510 allocated to the customer.

By providing digital asset modeling tools for creation of asset models 324, as well as a platform for securely distributing these models, the IIH system 302 can enable OEMs or other equipment providers to build asset models 324 for integrating their industrial assets with work order management systems 402, and can add these asset models 324 to a cloud-based library. In this way, OEMs can progressively grow digital content that can be used to support new or existing installations of their equipment. The IIH system 302 can manage this digital library for multiple OEMs, vendors, system integrators, or service providers, organizing the models 324 according to industrial vertical (e.g., automotive, food and drug, oil and gas, mining, etc.), industrial application, equipment classes or types, or other categories.

Figure 12:
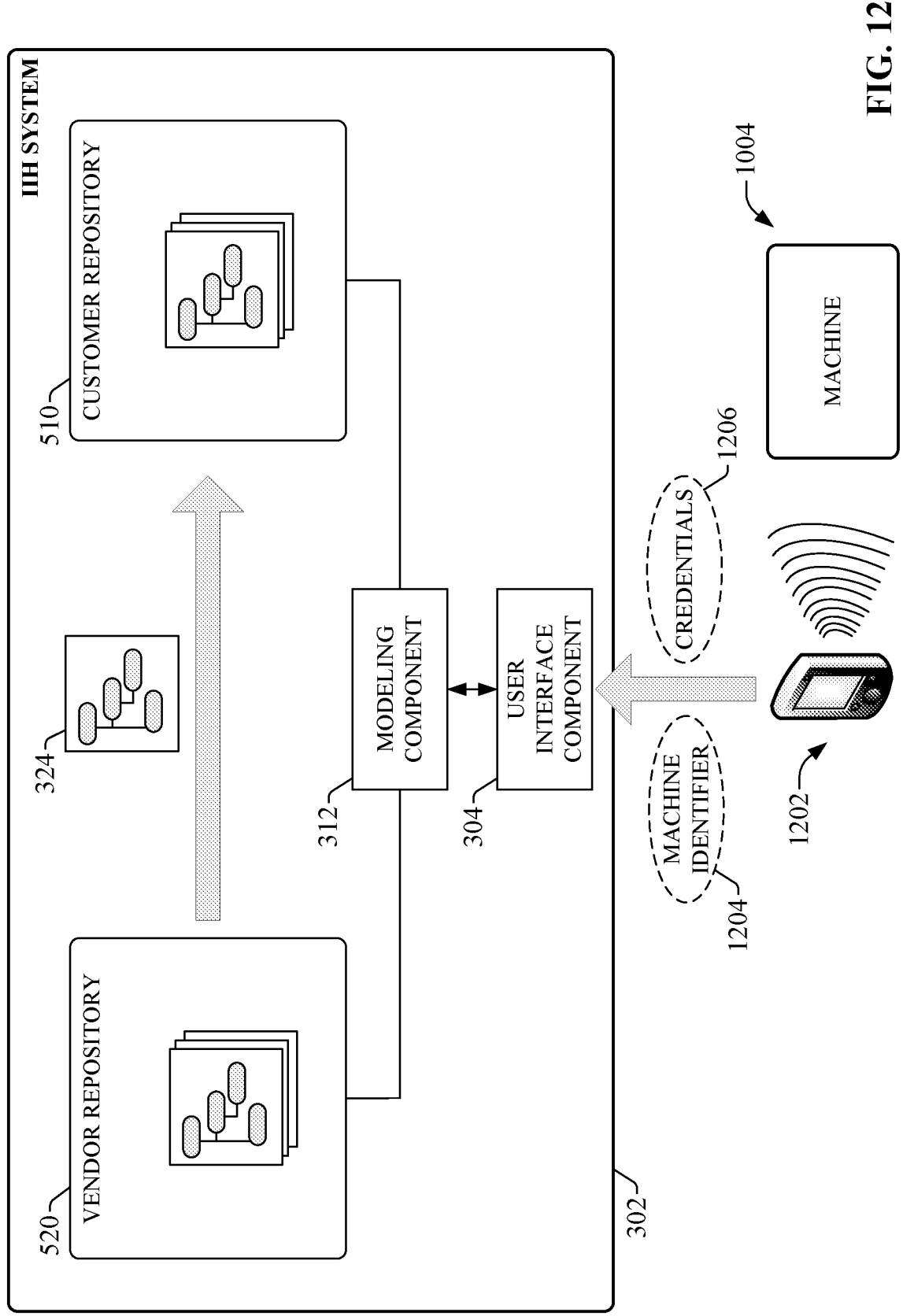
FIG. 12 is a diagram illustrating selection and integration of an asset model based on machine identity.

End users can also obtain and utilize asset models 324 in other ways in some embodiments. FIG. 12 is a diagram illustrating selection and integration of an asset model 324 based on machine identity. In this example, machine 1004 includes an optical code (e.g., two-dimensional barcode such as a QR code) representing a unique machine identifier that can be scanned by a user's client device 1202. The client device 1202 can then interface with the IIH system 302 (via user interface component 304) and submit the scanned machine identifier 1204 together with suitable credentials 1206 identifying the user of the client device 1202 as an authorized person with permission to commission the machine-specific asset model 324 to the customer repository 510. In response to receipt of the machine identifier 1204 and credentials 1206, the modeling component 312 can retrieve an asset model 324 corresponding to the machine identifier 1204 from the vendor repository 520 corresponding to the maker of the machine 1004 and commission the retrieved model 324 to the customer repository 510.

Although the previous examples considered a scenario in which an asset model 324 for a machine was developed and provided by a machine builder, asset models 324 for integrating a machine with a work order management system 402 can also be developed by the machine owner or by third-party entities. In this regard, personnel at an industrial enterprise may create their own asset models 324 defining maintenance conditions of concern for their industrial equipment and submit these asset models 324 to their customer repository 510 on the IIH system 302. End customers may also leverage the standardized models 1006 provided by third parties (see FIG. 10) in connection with developing asset models 324 for their own assets.

In some embodiments, the monitoring component 308 can also be configured to apply intelligent analytics to the incoming device data 804 to learn expected ranges of values for the data tags or automation object properties during normal operation, or to learn states of the incoming device data 804 that typically lead to the substandard performance or that presage a performance problem. This intelligent analysis can be performed in conjunction with the asset models 324 to refine the ranges of expected values defined by the models 324. This analysis may also be performed as a substitute for the asset models 324. The learned ranges of expected data tag or automation object values can then be used by the monitoring component 308 to determine when a work order should be initiated in the work order management system 402.

As noted above, some asset models 324 can encode, for each defined maintenance action, additional information about the maintenance to be performed when the device data 804 satisfies the maintenance trigger. This additional information can be used by the work order management system 402 to generate the corresponding work order 806; e.g., by populating data fields in the work order 806 using the data in the model 324. This information can include, for example, the asset to which the maintenance should be directed, a description of the maintenance issue, a number of personnel expected to be required to carry out the maintenance action, or other such information. In some scenarios, some of the information required to generate the work order may also be retrieved from an external system that stores the relevant information, such as an MES system 102 that monitors and manages operations on the control level of the customer's industrial enterprise in view of higher-level business considerations.

Figure 13:
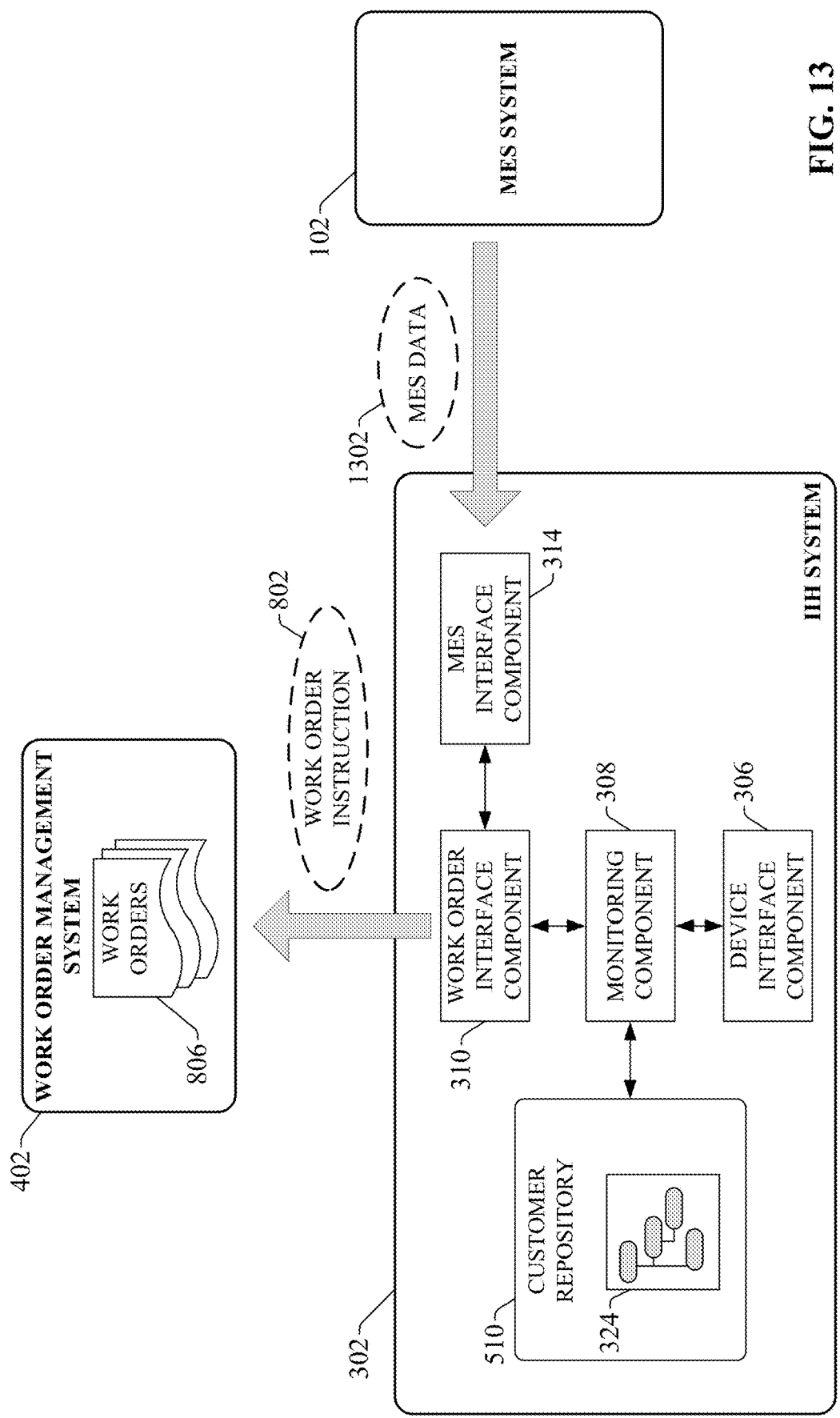
FIG. 13 is a diagram illustrating retrieval of MES data from an MES system by an IIH system.

FIG. 13 is a diagram illustrating retrieval of MES data 1302 from an MES system 102 by the IIH system 302. When the monitoring component 308 determines that device data 804 (not shown in FIG. 13) satisfies a maintenance condition defined by the asset model 324 as described above, the work order interface component 310 can retrieve, via the MES interface component 314, information from the customer's MES system 102 that can be used by the work order management system 402 to generate a suitable work order 806 for carrying out the maintenance task. For example, if the MES system 102 maintains information regarding the roles and availability schedules of plant personnel, the work order interface component 310 can retrieve, as MES data 1302, identities of maintenance personnel who are qualified to attend to the maintenance task and whose schedules indicate availability to work on the task. This information can be included in the work order instruction 802 so that the work order management system 402 can associate the identities of the designated personnel with the work order 806. IIH system 302 may also retrieve other types of data 1302 from the MES system 102 as needed to complete a work order for the maintenance task being initiated.

Figure 14:
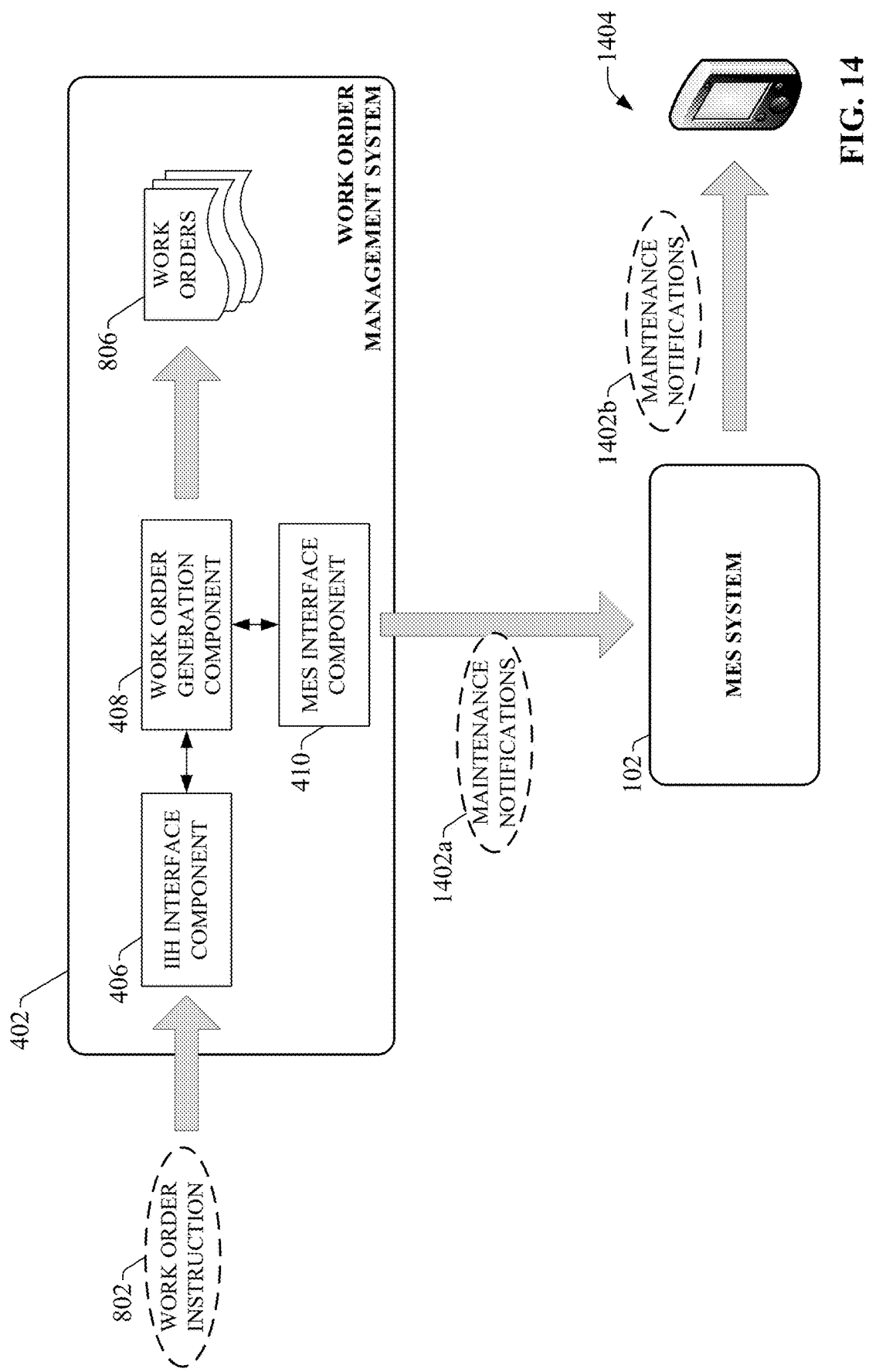
FIG. 14 is a diagram illustrating creation of a work order by a work order management system and transmission of a corresponding maintenance notification.

FIG. 14 is a diagram illustrating creation of a work order 806 by the work order management system 402 and transmission of a corresponding maintenance notification 1402. Work order management system 402 can include an IIH interface component 406 that interfaces the system 402 to the IIH system 302. This architecture allows the IIH system 302 to act as a data monitoring service that initiates automated creation of work orders 806 based on real-time monitoring of relevant machine operating metrics. Upon receipt of a work order instruction 802 from the IIH system 302, a work order generation component 408 leverages information included in the instruction 802 to generate a work order 806 for the necessary maintenance task. In some embodiments, either of the work order management system 402 or the IIH system 302 can also generate and send maintenance notifications 1402 to relevant plant personnel when the automated work order is generated 806. In the embodiment depicted in FIG. 14, the work order management system 402 sends the notification 1402 via the plant's MES system 102, which relays the notification 1402 to one or more client devices 1404 associated with the personnel to be notified of the newly scheduled maintenance task. The notification recipients can be selected to correspond to the personnel assigned to the work order, as well as other management personnel.

Although FIG. 14 depicts the maintenance notifications 1402 being delivered by the MES system 102, in some embodiments the IIH system 302 itself can deliver the notifications 1402 in response to the determination by the monitoring component 308 that the maintenance task is required.

Embodiments of the IIH system 302, working in conjunction with the work order management system 402, can create a cloud-based ecosystem that leverages predefined knowledge of industrial assets and their operation to automate creation of work orders for maintenance tasks to be performed on the assets. The IIH system 302 can play the role of a trusted information broker between the work order management system 402 and the customer's OT environment, and provides a platform for automated scheduling of maintenance tasks when sub-standard asset operation is detected, or preemptive scheduling of maintenance tasks when asset operation is predicted to deteriorate below acceptable parameters. Additionally, the IIH system 302 can provide tools and support to OEMs and other subject matter experts, allowing those users to distribute digital assets—such as asset models that facilitate automated generation of work orders—to users of their equipment via the ecosystem.

Figure 15:
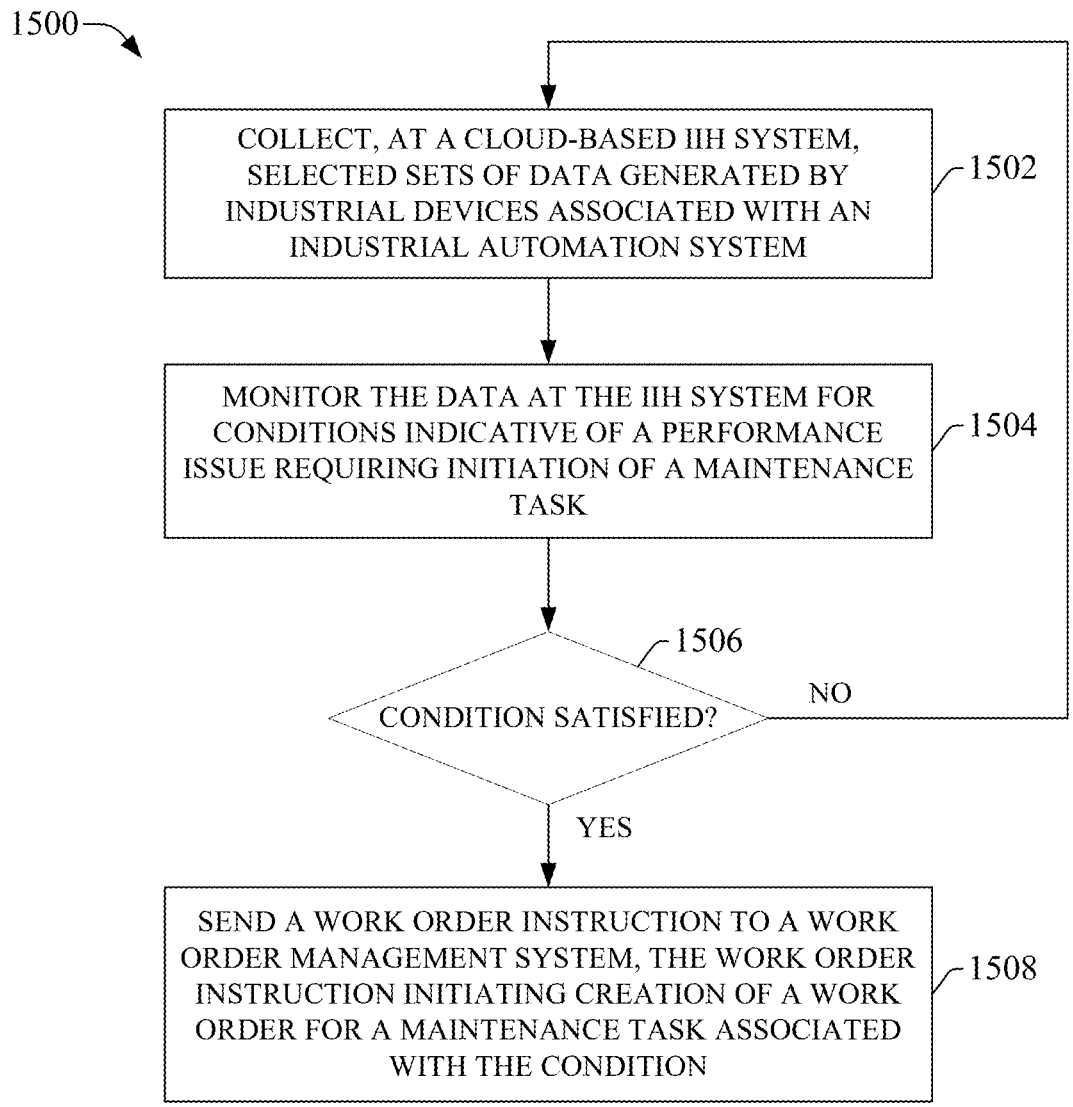
FIG. 15 is a flowchart of an example methodology for automatically generating a work order to perform maintenance on an industrial asset.
Figure 16:
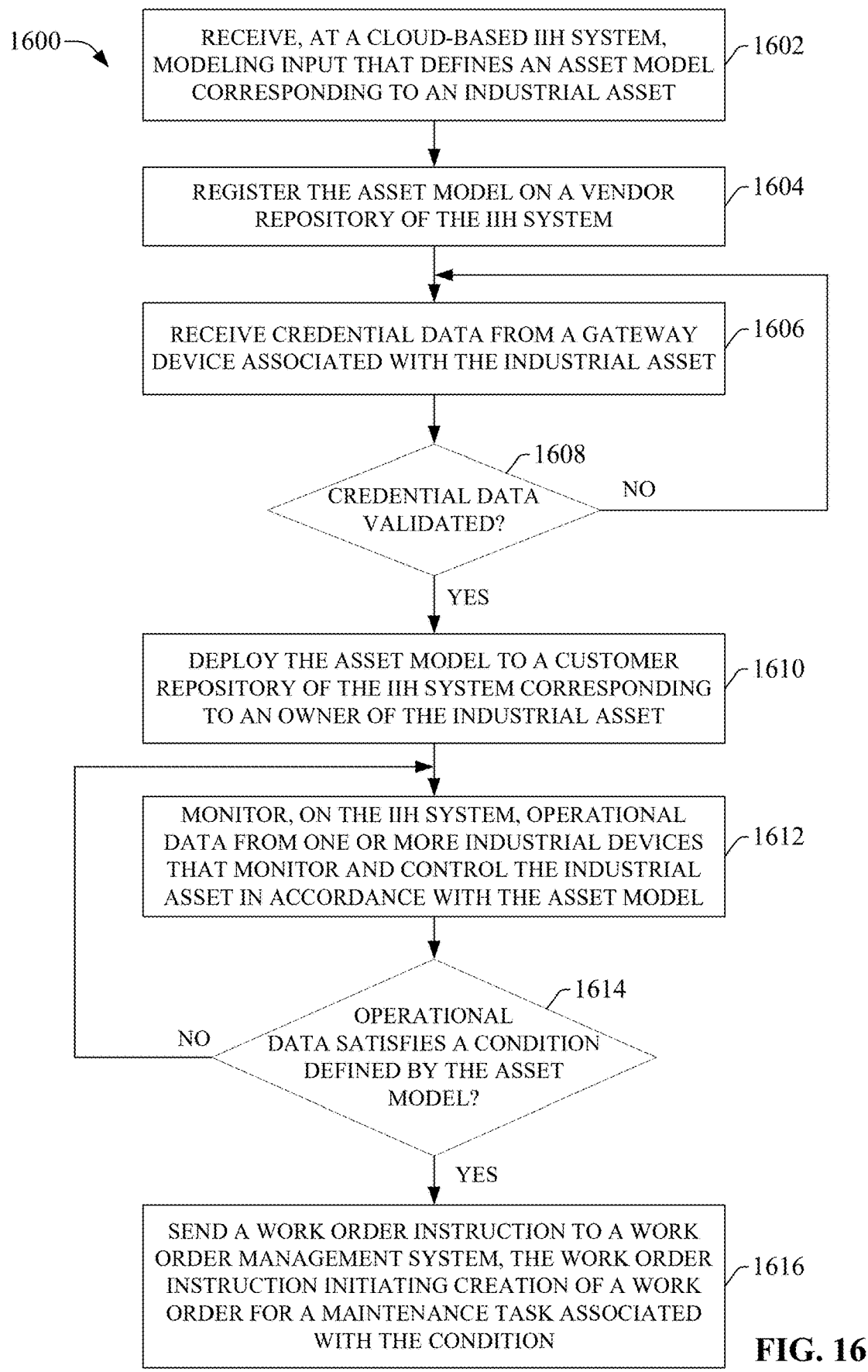
FIG. 16 is a flowchart of an example methodology for registering, deploying, and using digital asset models in connection with generating automated work orders for industrial maintenance tasks.

FIGS. 15-16 illustrate methodologies in accordance with one or more embodiments of the subject application. While, for purposes of simplicity of explanation, the methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 15 illustrates an example methodology 1500 for automatically generating a work order to perform maintenance on an industrial asset. Initially, at 1502, selected sets of data generated by industrial devices associated with an industrial automation system are collected at a cloud-based industrial information hub (IIH) system. In some scenarios, the data can be collected from data tags or automation objects defined on an industrial controller or other industrial device that monitors and controls the automation system, where the data tags or automation objects at as containers for the data. The data represents operational, status, or health information measured for the automation system, and may comprise telemetry values obtained from meters or sensors, status information read from sensors or smart devices (e.g., variable frequency drives), or other such data. The data may be collected by a gateway device that reads the data from the industrial devices and sends the data to the IIH system for monitoring and processing.

At 1504, the data collected at step 1502 is monitored at the IIH system for conditions indicative of a performance issue requiring initiation of a maintenance task. In some embodiments, the IIH system may be configured to recognize when one or more of the monitored data values fall outside an expected range suggestive of normal operation of the automation system, or otherwise satisfy a condition indicative of an abnormal performance issue that requires investigation or correction by maintenance personnel.

At 1506, a determination is made as to whether the condition indicative of the performance issue is satisfied by the collected data. If the condition is not satisfied (NO at step 1506), the methodology returns to step 1502, and steps 1502-1506 are repeated until the condition is determined to be satisfied. If the condition indicating the performance issue is satisfied (YES at step 1506), the methodology proceeds to step 1508, where the IIH system sends a work order instruction to a work order management system. The work order instruction initiates creation of a work order for a maintenance task associated with the detected condition. The work order instruction can include information about the type of maintenance action to be performed, which can be leveraged by the work order management system in connection with generating the work order. This information can include, but is not limited to, a portion of the automation system to which the maintenance task is to be directed, a type maintenance to be performed, an estimated number of hours to be scheduled to complete the task, an estimated number of maintenance personnel to be assigned to the task, or other such information.

FIG. 16 illustrates an example methodology 1600 for registering, deploying, and using digital asset models in connection with generating automated work orders for industrial maintenance tasks. Initially, at 1602, modeling input is received at a cloud-based IIH system, where the modeling input defines an asset model corresponding to an industrial asset. The asset model can define one or more conditions of the maintenance asset that, if satisfied, will require scheduling of a maintenance task and opening of a corresponding work order. For each defined condition, the asset model can also define one or more data items—e.g., data tags or automation object properties defined on an industrial controller or other type of industrial device—whose values dictate whether the condition is satisfied, as well as the states or values of these data items that cause the condition to be satisfied. At 1604, the asset model is registered on a cloud-based vendor repository of the IIH system.

At 1606, credential data is received from a gateway device associated with the industrial asset. In an example scenario, the provider of the industrial asset (e.g., an OEM or other equipment vendor) may provide the industrial asset together with the credential data that permits access to the asset model. The purchaser of the asset can then install the asset in their industrial facility and send, via the gateway device, the credential data to the IIH system for validation. At 1608, a determination is made as to whether the credential data received at step 1606 is validated by the IIH system. If the credential data is not validated (NO at step 1608), the methodology returns to step 1606 and the IIH system awaits receipt of verifiable credential data. If the credential data is validated (YES at step 1608), the methodology proceeds to step 1610, where the asset model is deployed to one or both of the gateway device or to a customer repository of the IIH system corresponding to the owner of the industrial asset.

At 1612, operational data from one or more industrial devices that monitor and control the industrial asset are monitored in accordance with the asset model. The operational data can be read from the relevant industrial devices by the gateway device, which then sends to the cloud-based IIH system for monitoring and analysis. At 1614, a determination is made as to whether the operational data satisfies a condition, defined by the asset model, indicative of a performance issue that requires scheduling of maintenance and opening of a corresponding work order. If the data does not satisfy the condition (NO at step 1614), the methodology returns to step 1612 and the data continues to be monitored. If the operational data satisfies the condition (YES at step 1614), the methodology proceeds to step 1616, where the IIH system sends a work order instruction to a work order management system. The work order instruction initiates creation of a work order for a maintenance task associated with the condition.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, Open Platform Communications Unified Architecture (OPC-UA), and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 17:
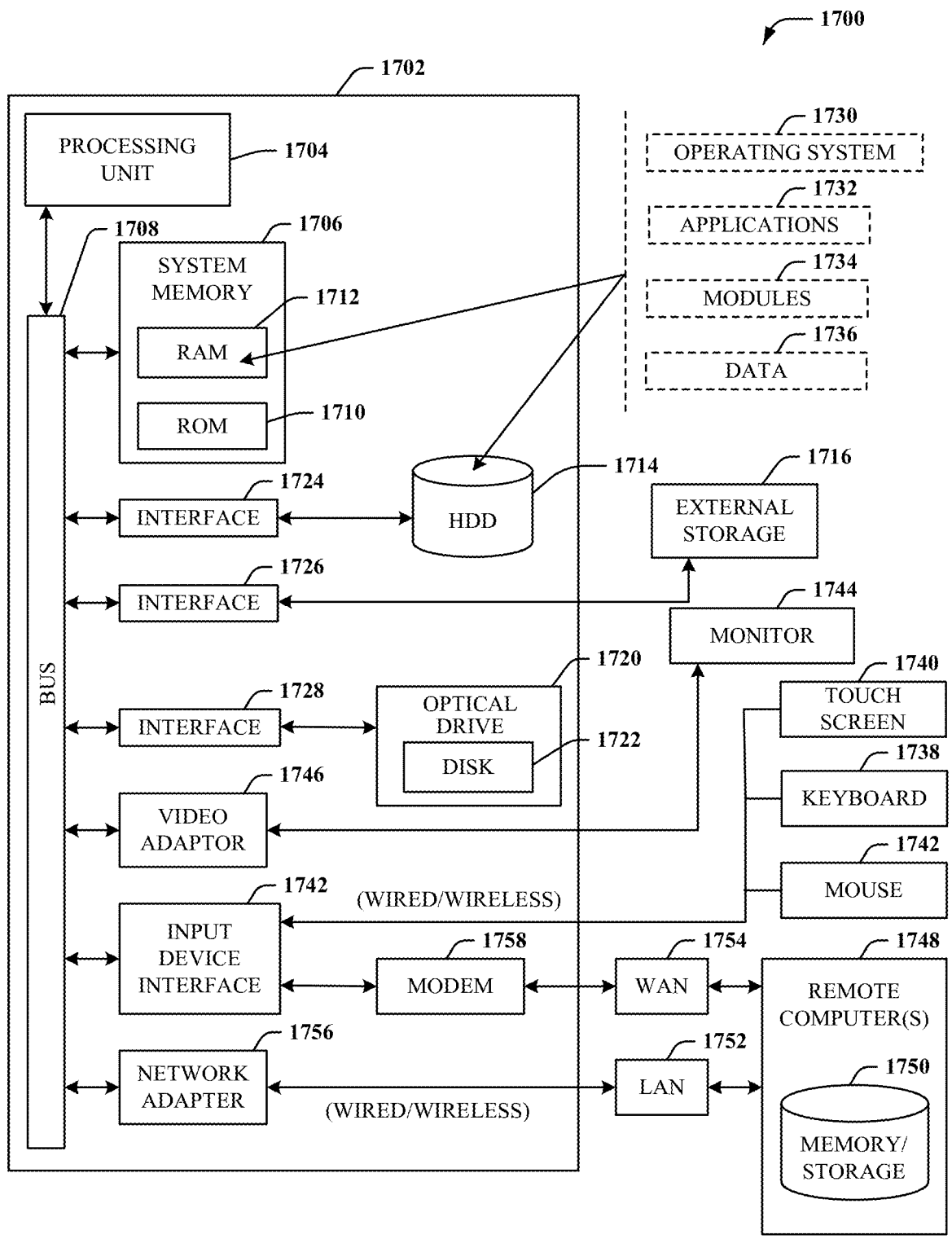
FIG. 17 is an example computing environment.
Figure 18:
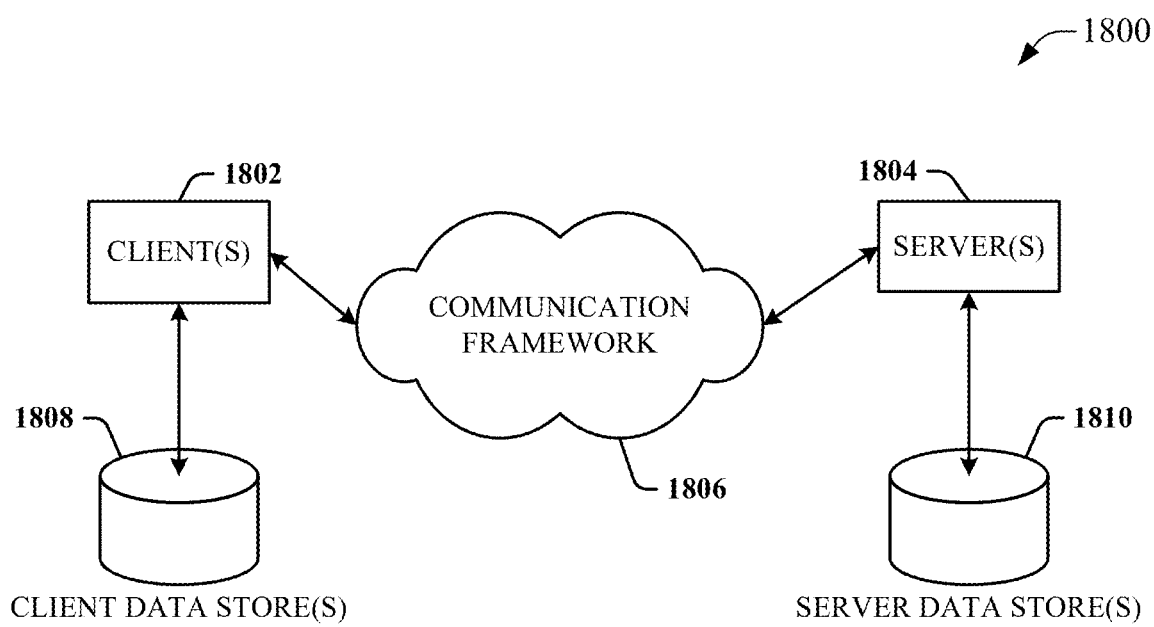
FIG. 18 is an example networking environment.

In order to provide a context for the various aspects of the disclosed subject matter, FIGS. 17 and 18 as well as the following discussion are intended to provide a brief, general description of a suitable environment in which the various aspects of the disclosed subject matter may be implemented.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid state drive (SSD) could be used in addition to, or in place of, an HDD 1714. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for application programs 1732. Runtime environments are consistent execution environments that allow application programs 1732 to run on any operating system that includes the runtime environment. Similarly, operating system 1730 can support containers, and application programs 1732 can be in the form of containers, which are lightweight, standalone, executable packages of software that include, e.g., code, runtime, system tools, system libraries and settings for an application.

Further, computer 1702 can be enable with a security module, such as a trusted processing module (TPM). For instance with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1744 or other type of display device can be also connected to the system bus 1708 via an interface, such as a video adapter 1746. In addition to the monitor 1744, a computer typically includes other peripheral output devices (not shown), such as speakers, printers, etc.

The computer 1702 can operate in a networked environment using logical connections via wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the local network 1752 through a wired and/or wireless communication network interface or adapter 1756. The adapter 1756 can facilitate wired or wireless communication to the LAN 1752, which can also include a wireless access point (AP) disposed thereon for communicating with the adapter 1756 in a wireless mode.

When used in a WAN networking environment, the computer 1702 can include a modem 1758 or can be connected to a communications server on the WAN 1754 via other means for establishing communications over the WAN 1754, such as by way of the Internet. The modem 1758, which can be internal or external and a wired or wireless device, can be connected to the system bus 1708 via the input device interface 1742. In a networked environment, program modules depicted relative to the computer 1702 or portions thereof, can be stored in the remote memory/storage device 1750. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1752 or WAN 1754 e.g., by the adapter 1756 or modem 1758, respectively. Upon connecting the computer 1702 to an associated cloud storage system, the external storage interface 1726 can, with the aid of the adapter 1756 and/or modem 1758, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 18 is a schematic block diagram of a sample computing environment 1800 with which the disclosed subject matter can interact. The sample computing environment 1800 includes one or more client(s) 1802. The client(s) 1802 can be hardware and/or software (e.g., threads, processes, computing devices). The sample computing environment 1800 also includes one or more server(s) 1804. The server(s) 1804 can also be hardware and/or software (e.g., threads, processes, computing devices). The servers 1804 can house threads to perform transformations by employing one or more embodiments as described herein, for example. One possible communication between a client 1802 and servers 1804 can be in the form of a data packet adapted to be transmitted between two or more computer processes. The sample computing environment 1800 includes a communication framework 1806 that can be employed to facilitate communications between the client(s) 1802 and the server(s) 1804. The client(s) 1802 are operably connected to one or more client data store(s) 1808 that can be employed to store information local to the client(s) 1802. Similarly, the server(s) 1804 are operably connected to one or more server data store(s) 1810 that can be employed to store information local to the servers 1804.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
  a device interface component configured to communicatively connect, via a cloud platform, to a gateway device that collects industrial data generated by industrial devices associated with an automation system, and to receive the industrial data from the gateway device;
  a monitoring component configured to monitor the industrial data in accordance with an asset model defined for the automation system that defines the industrial data to be monitored and a multi-dimensional value space for more than two items of the industrial data indicative of normal performance of the automation system, and to determine whether the more than two items of the industrial data deviate from the multi-dimensional value space; and
  a work order interface component configured to, in response to a determination by the monitoring component that the more than two items of the industrial data deviate from the multi-dimensional value space, send a work order instruction to a work order management system, the work order instruction initiating creation of a work order for performing a maintenance task to address a performance issue of the automation system indicated by deviation of the more than two of the items from the multi-dimensional value space.

2. The system of claim 1, wherein the industrial data comprises data retrieved from one or more data tags or automation objects defined on an industrial controller.

3. The system of claim 1, wherein the executable components further comprise a modeling component configured to receive, via interaction with model development interfaces, modeling input that defines the asset model and to store the asset model on a vendor repository associated with a builder of the automation system.

4. The system of claim 3, wherein the modeling component is further configured to, in response to receipt of credential information from an owner of the automation system indicating permission to access the asset model,
  retrieve the asset model from the vendor repository, and
  deploy the asset model to a customer repository associated with the owner of the automation system for access by the monitoring component.

5. The system of claim 1, wherein the work order instruction comprises information used by the work order management system to generate the work order, the information comprising at least one of an identity of an industrial asset of the automation system to which the maintenance task is directed, a type of maintenance to be performed on the industrial asset, an estimated number of hours to complete the maintenance task, or an estimated number of personnel to be assigned to the maintenance task.

6. The system of claim 5, wherein the executable components further comprise a manufacturing execution system (MES) interface component configured to retrieve at least a subset of the information included in the work order instruction from an MES system.

7. The system of claim 1, further comprising a user interface component configured to, in response to the determination that the two or more items of the industrial data deviate from the multi-dimensional value space, select one or more recipients to be alerted of the work order and send notifications to client devices associated with the recipients.

8. The system of claim 1, wherein the monitoring component is further configured to learn a condition of the industrial data indicative of the performance issue based on analysis of the industrial data over time.

9. A method, comprising:
receiving, by a system comprising a processor via a cloud platform, industrial data from a gateway device that collects the industrial data from industrial devices associated with an industrial machine;
monitoring, by the system, the industrial data in accordance with an asset model defined for the industrial machine that defines the industrial data to be monitored and a multi-dimensional value space for more than two items of the industrial data indicative of normal performance of the industrial machine; and
in response to detecting, based on the monitoring, a deviation of the more than two items of the industrial data from the multi-dimensional value space, sending, by the system, a work order instruction to a work order management system, the work order instruction instructing the work order management system to generate a work order for performing a maintenance task to address a performance issue of the industrial machine indicated by the deviation.

10. The method of claim 9, wherein the gateway device retrieves at least a subset of the industrial data from a data tag or an automation object defined on an industrial controller.

11. The method of claim 9, further comprising:
creating, by the system, the asset model based on modeling input receiving via interaction with model development interfaces; and
storing, by the system, the asset model on a vendor repository associated with a builder of the industrial machine.

12. The method of clam 12, wherein the work order instruction comprises information used by the work order management system to generate the work order, the information comprising at least one of an identity of an industrial asset to which the maintenance task is directed, a type of maintenance to be performed on the industrial asset, an estimated number of hours to complete the maintenance task, or an estimated number of personnel to be assigned to the maintenance task.

13. The method of claim 12, further comprising retrieving, by the system, at least a subset of the information included in the work order instruction from a manufacturing execution system (MES).

14. The method of claim 9, further comprising, in response to the detecting of the deviation:
selecting, by the system, one or more recipients to be alerted of the performance issue, and
sending, by the system, notifications to client devices associated with the recipients.

15. The method of claim 9, further comprising learning, by the system, a condition of the industrial data indicative of the performance issue based on analysis of the industrial data over time.

16. A non-transitory computer-readable medium having stored thereon instructions that, in response to execution, cause a system executing on a cloud platform and comprising a processor to perform operations, the operations comprising:

receiving, via a cloud platform, industrial data from a gateway device that collects the industrial data from industrial devices associated with an industrial machine;

monitoring values of the industrial data based on an asset model defined for the industrial machine that defines the industrial data to be monitored and a multi-dimensional value space for more than two items of the industrial data indicative of normal performance of the industrial machine; and in response to determining, based on the monitoring, that the values of the industrial data deviate from the multi-dimensional value space, sending a work order instruction to a work order management system, the work order instruction instructing the work order management system to generate a work order for performing a maintenance task to address a performance issue of the industrial machine indicated by deviation of the values from the multi-dimensional value space.

17. The non-transitory computer-readable medium of claim 16, wherein the gateway device retrieves at least a subset of the industrial data from a data tag or an automation object defined on an industrial controller.

18. The non-transitory computer-readable medium of claim 16, wherein the work order instruction comprises information used by the work order management system to generate the work order, the information comprising at least one of an identity of an industrial asset to which the maintenance task is directed, a type of maintenance to be performed on the industrial asset, an estimated number of hours to complete the maintenance task, or an estimated number of personnel to be assigned to the maintenance task.

19. The non-transitory computer-readable medium of claim 16, wherein the operations further comprise:
    creating the asset model based on modeling input receiving via interaction with model development interfaces; and
    storing the asset model on a vendor repository associated with a builder of the industrial machine.

20. The non-transitory computer-readable medium of claim 16, wherein the operations further comprise retrieving at least a subset of the information included in the work order instruction from a manufacturing execution system (MES).

* * * * *